(12) United States Patent
Davis

(10) Patent No.: US 11,562,353 B2
(45) Date of Patent: Jan. 24, 2023

(54) METHOD AND SYSTEM FOR GROSS SETTLEMENT BY USE OF AN OPAQUE BLOCKCHAIN

(71) Applicant: MasterCard International Incorporated, Purchase, NY (US)

(72) Inventor: Steven Charles Davis, Saint Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 601 days.

(21) Appl. No.: 14/950,117

(22) Filed: Nov. 24, 2015

(65) Prior Publication Data

US 2017/0148016 A1 May 25, 2017

(51) Int. Cl.
*G06Q 20/38* (2012.01)
*G06Q 20/02* (2012.01)
(Continued)

(52) U.S. Cl.
CPC ......... *G06Q 20/3827* (2013.01); *G06Q 20/02* (2013.01); *G06Q 20/389* (2013.01);
(Continued)

(58) Field of Classification Search
CPC ................................................ G06Q 20/3827
See application file for complete search history.

(56) References Cited

U.S. PATENT DOCUMENTS 9,679,276 B1 6/2017 Cuende
11,055,707 B2 * 7/2021 Lingappa ............. G06Q 20/065
(Continued)

FOREIGN PATENT DOCUMENTS

CN 103927659 A 7/2014
CN 104580253 A 4/2015
(Continued)

OTHER PUBLICATIONS

Notification of Transmittal of the International Search Report and the Written Opinion of the International Searching Authority (Forms PCT/ISA/220, PCT/ISA/210, and PCT/ISA/237) dated Feb. 2, 2017, in the corresponding International Application No. PCT/US2016/057579. (16 pages).
(Continued)

*Primary Examiner* — John W Hayes
*Assistant Examiner* — Zehra Raza
(74) *Attorney, Agent, or Firm* — Panitch Schwarze Belisario & Nadel LLP

(57) ABSTRACT

A method for confirmation of an electronic transaction using a blockchain includes: receiving transaction data, the transaction data including a transaction amount and currency code; generating a transaction message formatted based on one or more standards including a first data element configured to store the transaction amount, a second data element configured to store the currency code, and a third data element configured to store an invoice identifier; transmitting the transaction message to a financial institution via a payment network; receiving a return message from the financial institution via the payment network formatted based on the one or more standards and including a data element configured to store the transaction amount, currency code, and invoice identifier; and generating a hash value based on application of hashing algorithms to the transaction amount, currency code, and invoice identifier stored in the data element included in the received return message.

14 Claims, 13 Drawing Sheets

(51) Int. Cl.
*H04L 9/32* (2006.01)
*G06Q 20/40* (2012.01)
*H04L 9/00* (2022.01)

(52) U.S. Cl.
CPC ......... *G06Q 20/401* (2013.01); *H04L 9/3239* (2013.01); *H04L 9/50* (2022.05); *H04L 2209/56* (2013.01)

(56) References Cited

U.S. PATENT DOCUMENTS

| | | | |
|---|---|---|---|
| 2004/0128240 | A1 | 7/2004 | Yusin |
| 2004/0128249 | A1 | 7/2004 | Hoffman |
| 2004/0153399 | A1 | 8/2004 | Wilkes |
| 2008/0288404 | A1* | 11/2008 | Pirzadeh ................ G06Q 40/02 705/44 |
| 2011/0004528 | A1* | 1/2011 | Donohue ............... G06Q 20/14 705/19 |
| 2011/0238541 | A1* | 9/2011 | Challener ........ G06Q 20/38215 705/30 |
| 2014/0358789 | A1* | 12/2014 | Boding ................ G06Q 20/405 705/44 |
| 2015/0066765 | A1 | 3/2015 | Banks et al. |
| 2015/0220892 | A1* | 8/2015 | Allen ................ G06Q 20/0655 705/71 |
| 2015/0332283 | A1* | 11/2015 | Witchey ................ G06Q 50/22 705/3 |
| 2016/0330034 | A1* | 11/2016 | Back ....................... G06Q 20/06 |
| 2017/0187535 | A1 | 6/2017 | Middleton et al. |

FOREIGN PATENT DOCUMENTS

| | | |
|---|---|---|
| CN | 104603808 A | 5/2015 |
| CN | 106664292 A | 5/2017 |
| JP | 2017-515252 A | 6/2017 |
| WO | 2007055675 A1 | 5/2007 |
| WO | 2008/060951 A2 | 5/2008 |
| WO | 2015/171580 A1 | 11/2015 |
| WO | 2017/091305 A1 | 6/2017 |

OTHER PUBLICATIONS

Gertrude Chavez-Dreyfuss: "IBM is looking to adopt bitcoin technology for major currencies—Business Insider", Mar. 12, 2015, XP055333933, URL:http://web.archive.org/web/20150929155653/http://www.businessinsider.com/r-exclusive-IBM-looking-at-adopting-bitcoin-technology-for-major-currencies-2015-3. (4 pages).

Wood, "Ethereum: A Secure Decentralised Generalised Transaction Ledger Final Draft—Under Review", Jun. 4, 2014, XP055242189, URL:http://gavwood.com/paper.pdf. (29 pages).

Office Action (Notification Of Reasons For Refusal) dated May 7, 2019, by the Japanese Patent Office in corresponding Japanese Patent Application No. 2018-526785, with English translation of the Office Action. (6 pages).

Office Action (First Office Action) dated Jun. 15, 2020, by the China National Intellectual Property Administration in corresponding Chinese Patent Application No. 201680067652.4 and an English Translation of the Office Action. (39 pages).

Office Action (First Examination Report) dated Jul. 10, 2020, by the Intellectual Property India in corresponding India Patent Application No. 201817004148 and an English Translation of the Office Action. (6 pages).

Office Action (Examination report No. 1 for standard patent application) dated May 4, 2021, by the Australian Patent Office in corresponding Australian Patent Application No. 2020201891. (3 pages).

Notice of Allowance (Decision to Grant a Patent) dated Sep. 14, 2021, by the Japanese Patent Office in corresponding Japanese Patent Application No. 2020-138918 and an English Translation of the Notice of Allowance. (4 pages).

Office Action (Decision of Rejection) dated Sep. 16, 2021, by the China National Intellectual Property Administration in corresponding Chinese Patent Application No. 201680067652.4 and an English Translation of the Office Action. (25 pages).

Office Action dated Oct. 12, 2021, by the Mexican Institute of Industrial Property in corresponding Mexican Patent Application No. MX/a/2018/005736 and an English Translation of the Office Action. (15 pages).

Office Action dated Mar. 15, 2022, by the Mexican Institute of Industrial Property in corresponding Mexican Patent Application No. MX/a/2018/005736 and an English Translation of the Office Action. (14 pages).

Office Action dated Aug. 9, 2022 in Mexican Application No. MX/a/2018/005736.

\* cited by examiner

METHOD AND SYSTEM FOR GROSS SETTLEMENT BY USE OF AN OPAQUE BLOCKCHAIN

FIELD

The present disclosure relates to gross settlement using an opaque blockchain, specifically the settlement of electronic transactions using a blockchain consisting of values generated by hashing captured electronic transaction data for fast and secure settlement.

BACKGROUND

When an electronic transaction is conducted between two parties, such as a consumer and a merchant, the consumer may provide their payment information to the merchant in return for goods or services. The merchant may run the payment information immediately, and the consumer may receive their purchase moments after. However, in many systems, settlement of the transaction between financial institutions on behalf of each of the two parties may take a considerably longer amount of time, often measured in days. Until the settlement is completed, the merchant does not receive their payment from their financial institution, and the charge on the consumer's account with their financial institution is listed as pending.

As a result, it may be beneficial to all entities involved if the settlement process could be completed faster, as the consumer's account would be up-to-date sooner and the merchant would receive their funds more quickly. However, existing settlement processes often include the relaying of several transaction messages back and forth across a payment network. Payment networks typically process hundreds of millions of transactions each day, each of which requires the routing of at least two transaction messages: an authorization request from an acquirer to an issuer and an authorization response from the issuer back to the acquirer. Due to the urgency of transaction processing, which is often measured in nano- or milliseconds for consumer and merchant convenience, settlement is often not performed as quickly due to bandwidth and performance issues, and instead is typically performed during times when transactions are conducted less frequently.

Thus, existing payment network systems are often unable to perform immediate settlement for electronic transactions due to the vast number of transactions being processed and bandwidth and resource limits of existing systems. As a result, there is a need for a technical solution where settlement of electronic transactions can be performed quickly and without added stress on existing payment rails.

SUMMARY

The present disclosure provides a description of systems and methods for confirming electronic transactions using an opaque blockchain.

A method for confirmation of an electronic transaction using a blockchain includes: receiving, by a receiving device of a processing server, a data signal superimposed with transaction data, wherein the transaction data includes data related to an electronic transaction including at least a transaction amount and currency code; generating, by a data generation module of the processing server, a transaction message for the electronic transaction, wherein the transaction message is formatted based on one or more standards and includes a plurality of data elements including at least a first data element configured to store the transaction amount, a second data element configured to store the currency code, and a third data element configured to store an invoice identifier; electronically transmitting, by a transmitting device of the processing server, the generated transaction message to a financial institution via a payment network; receiving, by the receiving device of the processing server, a return message from the financial institution via the payment network, wherein the return message is formatted based on the one or more standards and includes at least a single data element configured to store the transaction amount, currency code, and invoice identifier; and generating, by a hashing module of the processing server, a hash value based on application of one or more hashing algorithms to the transaction amount, currency code, and invoice identifier stored in the single data element included in the received return message.

Another method for confirmation of an electronic transaction using a blockchain includes: receiving, by a receiving device of a processing server, a transaction message from a financial institution via a payment network, wherein the transaction message is formatted based on one or more standards and includes a plurality of data elements including at least a first data element configured to store the transaction amount, a second data element configured to store the currency code, and a third data element configured to store an invoice identifier; generating, by a data generation module of the processing server, a return message, wherein the return message is formatted based on the one or more standards and includes at least a single data element configured to store a transaction amount, currency code, and invoice identifier; generating, by a hashing module of the processing server, a hash value based on application of one or more hashing algorithms to the transaction amount, currency code, and invoice identifier stored in the single data element in the generated return message; electronically transmitting, by a transmitting device of the processing server, the generated return message to the financial institution via the payment network; and electronically transmitting, by the transmitting device of the processing server, the generated hash value to a computing device configured to post the generated hash value to a blockchain via a communication network.

A method for storing confirmations of electronic transactions using a blockchain includes: storing, in a memory of a processing server, a blockchain, wherein the blockchain includes a plurality of blocks and, for each block of the plurality of blocks, a header and a plurality of transaction values, where each transaction value of the plurality of transaction values is a hash value related to an electronic transaction and generated based on at least a transaction amount, currency code, and invoice identifier associated with the related electronic transaction; receiving, by a receiving device of the processing server, a set of new hash values, wherein each new hash value is related to an additional electronic transaction, and where each new hash value is generated based on application of one or more hashing algorithms to a transaction amount, currency code, and invoice identifier associated with the respective additional electronic transaction; executing, by a querying module of the processing server, a query on the memory to identify a preceding block of the plurality of blocks included in the blockchain based on data stored in the header included in each respective block; generating, by a generation module of the processing server, a proof of work value based on performing one or more predetermined actions; generating, by the generation module of the processing server, a new block, wherein the new block includes at least a new header and the set of new hash values, and wherein the new header includes at least a reference to the identified preceding block and the generated proof of work value; and electronically transmitting, by a transmitting device of the processing server, the generated new block to one or more computing devices associated with the blockchain.

A system for confirmation of an electronic transaction using a blockchain includes: a hashing module of a processing server; a receiving device of the processing server configured to receive a data signal superimposed with transaction data, wherein the transaction data includes data related to an electronic transaction including at least a transaction amount and currency code; a data generation module of the processing server configured to generate a transaction message for the electronic transaction, wherein the transaction message is formatted based on one or more standards and includes a plurality of data elements including at least a first data element configured to store the transaction amount, a second data element configured to store the currency code, and a third data element configured to store an invoice identifier; and a transmitting device of the processing server configured to electronically transmit the generated transaction message to a financial institution via a payment network. The receiving device of the processing server is further configured to receive a return message from the financial institution via the payment network, wherein the return message is formatted based on the one or more standards and includes at least a single data element configured to store the transaction amount, currency code, and invoice identifier. The hashing module of the processing server is configured to generate a hash value based on application of one or more hashing algorithms to the transaction amount, currency code, and invoice identifier stored in the single data element included in the received return message.

Another system for confirmation of an electronic transaction using a blockchain includes: a receiving device of a processing server configured to receive a transaction message from a financial institution via a payment network, wherein the transaction message is formatted based on one or more standards and includes a plurality of data elements including at least a first data element configured to store the transaction amount, a second data element configured to store the currency code, and a third data element configured to store an invoice identifier; a data generation module of the processing server configured to generate a return message, wherein the return message is formatted based on the one or more standards and includes at least a single data element configured to store a transaction amount, currency code, and invoice identifier; a hashing module of the processing server configured to generate a hash value based on application of one or more hashing algorithms to the transaction amount, currency code, and invoice identifier stored in the single data element in the generated return message; and a transmitting device of the processing server configured to electronically transmit the generated return message to the financial institution via the payment network, and electronically transmit the generated hash value to a computing device configured to post the generated hash value to a blockchain via a communication network.

A system for storing confirmations of electronic transactions using a blockchain includes: a memory of a processing server configured to store a blockchain, wherein the blockchain includes a plurality of blocks and, for each block of the plurality of blocks, a header and a plurality of transaction values, where each transaction value of the plurality of transaction values is a hash value related to an electronic transaction and generated based on at least a transaction amount, currency code, and invoice identifier associated with the related electronic transaction; a receiving device of the processing server configured to receive a set of new hash values, wherein each new hash value is related to an additional electronic transaction, and where each new hash value is generated based on application of one or more hashing algorithms to a transaction amount, currency code, and invoice identifier associated with the respective additional electronic transaction; a querying module of the processing server configured to execute a query on the memory to identify a preceding block of the plurality of blocks included in the blockchain based on data stored in the header included in each respective block; a generation module of the processing server configured to generate a proof of work value based on performing one or more predetermined actions, and generate a new block, wherein the new block includes at least a new header and the set of new hash values, and wherein the new header includes at least a reference to the identified preceding block and the generated proof of work value; and a transmitting device of the processing server configured to electronically transmit the generated new block to one or more computing devices associated with the blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
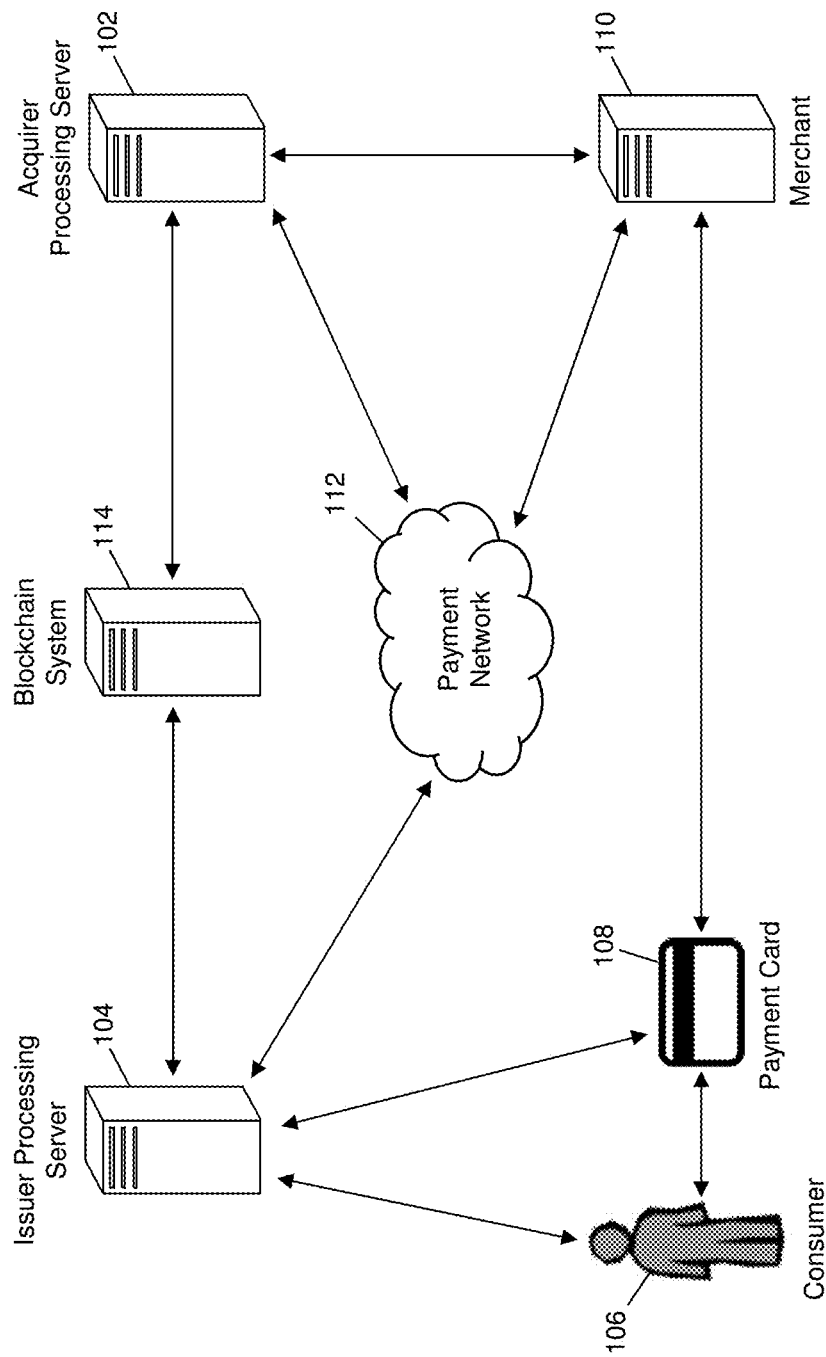
FIG. 1 is a block diagram illustrating a high level system architecture for the confirmation and gross settlement of electronic transactions using an opaque blockchain in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, additional information may be captured, such as a source address, timestamp, etc. In some embodiments, a blockchain may also consist of additional, and in some instances arbitrary, data that is confirmed and validated by the blockchain network through proof of work and/or any other suitable verification techniques associated therewith. In some cases, such data may be included in the blockchain as part of transactions, such as included in additional data appended to transaction data. In some instances, the inclusion of such data in a blockchain may constitute a transaction. In such instances, a blockchain may not be directly associated with a specific digital, virtual, fiat, or other type of currency.

System for Confirmation and Gross Settlement Using an Opaque Blockchain

FIG. 1 illustrates a system 100 for the confirmation and gross settlement of electronic transactions via the use of an opaque blockchain.

The system 100 may include an acquirer processing server 102. The acquirer processing server 102, discussed in more detail below, may be a computing system of an acquiring financial institution, such as an acquiring bank, configured to perform the processes discussed herein for gross settlement of electronic transactions via the use of an opaque blockchain. The acquiring financial institution associated with the acquirer processing server 102 may possess, manage, issue, or otherwise be associated with a transaction account associated with a merchant 110 for use in receiving funds for electronic transactions. The acquirer processing server 102 may be configured to use an opaque blockchain to confirm settlement of an electronic transaction involving the merchant 110 and to increase the balance of the merchant's transaction account by a corresponding amount.

The system 100 may also include an issuer processing server 104. The issuer processing server 104, discussed in more detail below, may be a computing system of an issuing financial institution, such as an issuing bank, configured to perform the processes discussed herein for gross settlement of electronic transactions via the use of an opaque blockchain. The issuing financial institution associated with the issuer processing server 104 may possess, manage, issue, or otherwise be associated with a transaction account associated with a consumer 106 for use in funding electronic transactions. The issuer processing server 104 may be configured to use an opaque blockchain to confirm settlement of an electronic transaction involving the consumer 106 and to decrease the balance of the consumer's transaction account by a corresponding amount.

The issuing financial institution may issue a payment card 108 or other payment instrument to the consumer 106 that is associated with the consumer's transaction account, which may be presented to a merchant 110 to convey payment details for use in the processing of an electronic payment transaction involving the consumer 106 and the merchant 110. The consumer 106 may present the payment card 108 to convey payment details to the merchant 110 using traditional methods, such as via the reading of a magnetic strip embedded in the payment card 108 encoded with payment details or the electronic transmission of a data signal from the payment card 108 superimposed with payment details to a point of sale system of the merchant 110 using near field communication or other suitable communication method. Additional methods for conveying payment details may include the use of a mobile computing device equipped with an electronic wallet application program for electronic transmission of payment details, the display of a machine-readable code encoded with payment details by a mobile computing device for reading by the point of sale system of the merchant 110, etc.

As part of the processing of the electronic transaction, the merchant 110 may electronically transmit the payment details received from the consumer 106 (e.g., via the payment card 108) and additional transaction data to the acquirer processing server 102. Payment details may include, for instance, a primary account number, expiration date, name, payment cryptograms, etc. The additional transaction data may include, for example, a transaction amount, a transaction time, a transaction date, geographic location, merchant category code, consumer data, point of sale data, merchant data, offer data, reward data, loyalty data, product data, etc. The payment details and additional transaction data may be electronically transmitted directly to the acquirer processing server 102 or may be transmitted via one or more intermediate entities, such as a gateway process. The payment details and additional transaction data may be electronically transmitted using the payment rails associated with a payment network 112 or via a suitable alternative communication network. Additional detail regarding the communication of transaction details for a payment transaction involving a payment network 112 and the payment rails are discussed in more detail below with respect to the process 1100 illustrated in FIG. 11.

Once the acquirer processing server 102 receives the payment details and additional transaction data, the acquirer processing server 102 may generate a transaction message for the electronic transaction. The transaction message may be a specialized data message that is specially formatted pursuant to one or more standards governing the exchange of financial transaction messages, such as the International Organization for Standardization's ISO 8583 standard. The transaction message may include a plurality of data elements configured to store data as set forth in the associated standard(s), such as a data element configured to store a primary account number, a data element configured to store a transaction amount, etc. The transaction message may also include a bitmap configured to store data indicative of the data stored in each of the data elements included therein, which may be based on the associated standard(s). In some instances, a transaction message may also include a message type indicator indicative of a type of the transaction message, such as an authorization request.

The transaction message generated by the acquirer processing server 102 may include a plurality of data elements configured to store the payment details and additional transaction data. The plurality of data elements may include at least a first data element configured to store a transaction amount for the electronic transaction, a second data element configured to store a currency code, and a third data element configured to store an invoice identifier. The currency code may be indicative of the currency associated with the transaction account associated with the merchant 110 or used in the electronic transaction between the merchant 110 and consumer 106. The currency code may be included in the transaction data conveyed by the merchant 110 or may be identified by the acquirer processing server 102, such as based on the transaction account associated with the merchant 110. In some instances, the currency code may be included in the payment details, such as based on a currency associated with the transaction account corresponding to the payment card 108 presented by the consumer 106. The invoice identifier may be a value generated or otherwise identified by the acquirer processing server 102 that is unique to the electronic transaction being processed, which may be used for identification of transaction messages and other data associated with the electronic transaction. The transaction message may also include a message type indicator indicative of the transaction message being an authorization request.

The acquirer processing server 102 may electronically transmit the generated transaction message to the payment network 112 via the payment rails. The payment network 112 may forward the transaction message to the issuer processing server 104, also via the payment rails, for additional processing. The payment network 112 may be configured to identify the issuer processing server 104 using one or more traditional methods, such as based on a bank identification number included in a primary account number stored in a corresponding data element included in the transaction message. In some embodiments, the payment network 112 may perform one or more additional services prior to forwarding the transaction messages, such as fraud detection services, account mapping services, transaction control services, etc.

The issuer processing server 104 may receive the transaction message and may determine approval or denial of the related transaction message based on data stored therein using traditional methods and systems. For example, the issuer processing server 104 may identify a transaction account associated with the primary account number stored in a corresponding data element included in the transaction message and identify if an account balance associated therewith is suitable for funding the electronic transaction based on the transaction amount for the electronic transaction, stored in a corresponding data element included in the transaction message. The issuer processing server 104 may also determine approval or denial based on, for instance, fraud considerations, account settings, transaction controls, credit limits, etc.

If the transaction is approved or declined, the issuer processing server 104 may generate a return transaction message. The return transaction message may be formatted based on the same standards used in the formatting of the received transaction message. In some instances, the return transaction message may be a modification of the received transaction message, such as where one or more data elements included therein are modified and where the message type indicator is modified to be indicative of an authorization response. The return transaction message may include a data element configured to store a response code, which may indicate that the related electronic transaction is approved or declined. The return transaction message may also include an additional data element configured to store the transaction amount, currency code, and invoice identifier as parsed from the respective corresponding data elements included in the received transaction message. In some embodiments, the additional data element may be indicated in the associated standard(s) as a data element reserved for private use. In some instances, the issuer processing server 104 may also be configured to store additional data in the additional data element in addition to the currency code, transaction amount, and invoice identifier, and may format the data stored in the additional data element based on a formatting standard agreed upon by the issuer processing server 104 and acquirer processing server 102.

Once the return transaction message is generated, the issuer processing server 104 may electronically transmit the return transaction message to the payment network 112 via the payment rails. The payment network 112 may then perform any necessary services, such as the remapping of account numbers, and may forward the return transaction message to the acquirer processing server 102 via the payment rails. The acquirer processing server 102 may electronically transmit a notification to the merchant 110 using the payment rails or a suitable communication network indicating that the electronic transaction was approved. In some instances, the notification may comprise the return transaction message. The merchant 110 may receive the notification and may finalize the electronic transaction with the consumer 106, such as by furnishing the transacted-for goods or services to the consumer 106.

As part of the gross settlement of the electronic transaction, the issuer processing server 104 may be configured to generate a hash value for the electronic transaction. The hash value may be generated by applying one or more hashing algorithms to the data stored in the additional data element included in the return transaction message, which includes at least the transaction amount, currency code, and invoice identifier for the transaction and is formatted using a standard agreed upon between the issuer processing server 104 and the acquirer processing server 102. The resulting hash value may be a value unique to the electronic transaction that is unable to be reversed into the underlying data via the use of one-way hash functions as the hashing algorithms with an extremely low likelihood of duplication such that no two electronic transactions, even among hundreds of millions processed each day, are likely to return the same hash value.

Once the hash value has been generated by the issuer processing server 104, the issuer processing server 104 may electronically transmit the hash value to a blockchain system 114 for posting to an opaque blockchain. In some embodiments, the issuer processing server 104 or acquirer processing server 102 may be configured to operate as a node in the blockchain system 114 and may be configured to perform the functions discussed herein for adding the hash value for the electronic transaction to the opaque blockchain.

The blockchain system 114 may receive the hash value for the electronic transaction. The blockchain system 114 may also receive the hash values for additional electronic transactions from the issuer processing server 104 and/or the systems of additional issuing financial institutions. Once a predetermined number or size of hash values have been received, the blockchain system 114 may generate a new block to be added to the blockchain. The generation of a new block may include the generation of a proof-of-work value, which may be generated via the solving of a complex mathematical problem or other suitable method. In some instances, the complex mathematical problem may be of a difficulty level determined by one or more computing devices (e.g., nodes) in a blockchain network associated with the blockchain system 114, such as a difficulty level where it may take a predetermined period of time for the blockchain system 114 or another node in the blockchain network to solve the mathematical problem, such as ten minutes.

In some embodiments, the new block may also include a reference to a preceding block in the blockchain, such as the most recent block to be added to the blockchain prior to generation of the new block. The most recent block may be determined based on a date of inclusion included in a header of the preceding block, or based on a location of the preceding block in the blockchain, such as being at an end of the blockchain. The reference may be an identification number or other value suitable for use in the identification of a block in the opaque blockchain, such as a hash of a header of the preceding block. The new block may include the proof-of-work value and the reference identifier in a header for the newly generated block. The new header may also include a transaction counter, which may indicate the number of hash values being included in the new block. The remainder of the newly generated block may be comprised of the hash values to be included therein.

Once the block is generated, the blockchain system 114 may append the newly generated block to the opaque blockchain. In some instances, the blockchain system 114 may electronically transmit the newly generated block to one or more nodes associated with the opaque blockchain for inclusion therein, which may confirm the new block (e.g., based on the proof-of-work value included therein) prior to adding the new block to the opaque blockchain. The blockchain may be considered an opaque blockchain as the hash values included therein may be opaque in that any entity may view the hash values included in the blocks comprising the blockchain, but may be unaware of the data represented by the hash values due to the use of one-way hashing algorithms.

The acquirer processing server 102 may be configured to generate a hash value for the electronic transaction using the data stored in the additional data element included in the return transaction message. The acquirer processing server 102 may use the same one or more hashing algorithms used by the issuer processing server 104 and apply the algorithms to the data stored in the additional data element to generate a hash value. The generated hash value may be a key in a key-value pair, where the value associated with the hash value are the currency code, transaction amount, and invoice identifier used in the generation thereof. The acquirer processing server 102 may retrieve the blockchain from the blockchain system 114 or another node associated with the opaque blockchain, and may then identify if the opaque blockchain includes the hash value. If the hash value generated by the acquirer processing server 102 is the same as a hash value included in the opaque blockchain, it may serve as confirmation of the electronic transaction as it indicates that the issuer processing server 104 and acquirer processing server 102 are in agreement as to the currency type and amount used in the transaction, as well as for which transaction the values are associated via the invoice identifier.

Once the transaction is confirmed, the acquirer processing server 102 may deposit funds in the transaction account associated with the merchant 110 involved in the electronic transaction based on the transaction amount associated with that hash value. Similarly, the issuer processing server 104 may confirm the electronic transaction using the opaque blockchain via a similar method, and may deduct the transaction amount from the transaction account associated with the consumer 106 whose payment details were presented to the merchant 110 for payment.

By posting the hash value for the electronic transaction to the opaque blockchain, the acquirer processing server 102 and issuer processing server 104 can confirm processing of the electronic transaction for settlement without the use of additional transaction messages conveyed via the payment network 112 and the associated payment rails. This may result in significantly faster settlement, where the transaction accounts for the consumer 106 and merchant 110 may be settled much faster than using traditional methods. In addition, by confirming the transaction for settlement outside of the payment network 112, the number of transaction messages conveyed using the payment network 112 and associated payment rails may be drastically reduced, which may result in increased performance and processing speed for the processing portion of the transactions. As such, the methods and systems discussed herein may increase the speed of both processing and settlement for electronic transactions via the use of an opaque blockchain. Furthermore, the use of opaque hash values in the blockchain may ensure that the data used for confirmation for settlement is easily and publicly accessible, but without compromising the data indicative thereof via the use of one-way hashing algorithms.

Acquirer Processing Server

Figure 2:
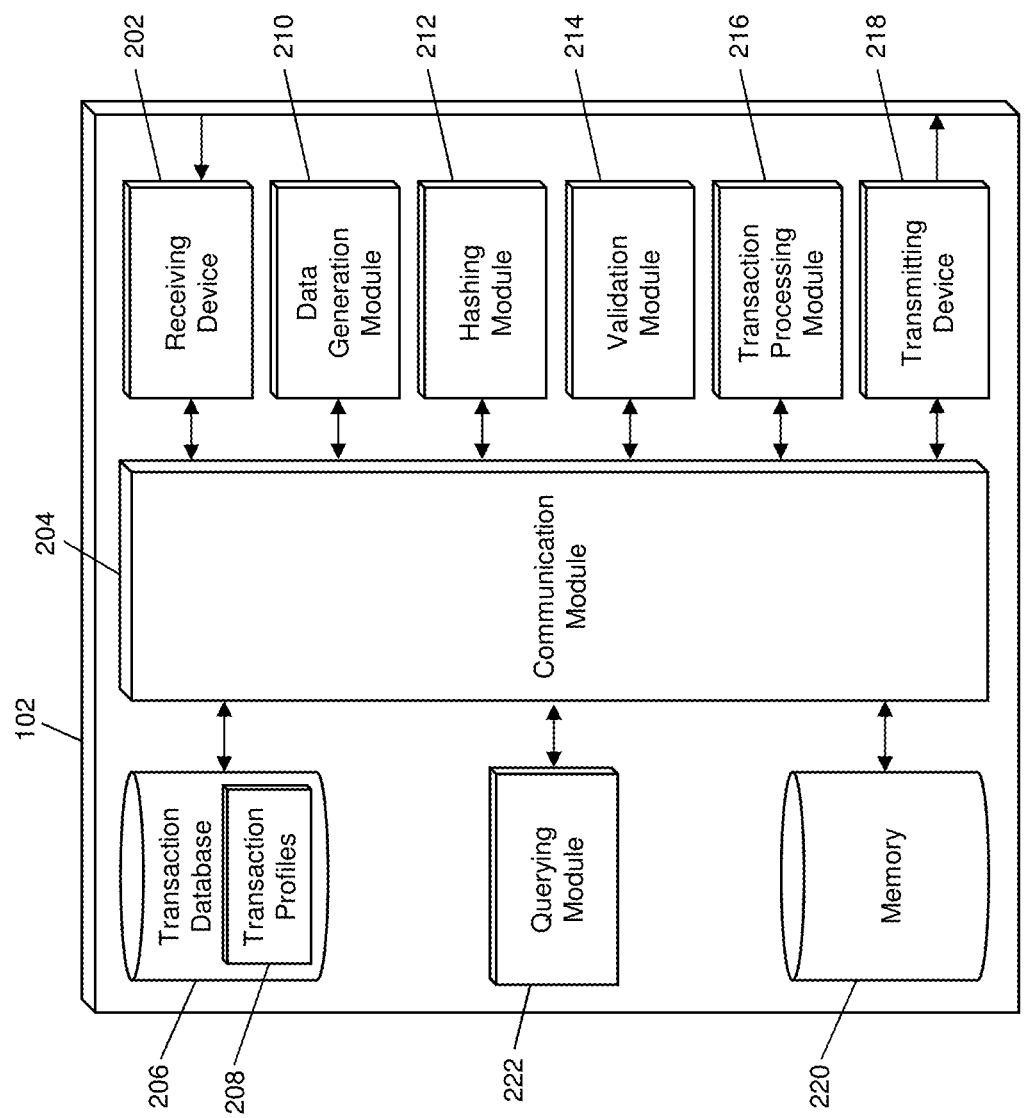
FIG. 2 is a block diagram illustrating the acquirer processing server of FIG. 1 for the gross settlement of electronic transactions using an opaque blockchain in accordance with exemplary embodiments.

FIG. 2 illustrates an embodiment of the acquirer processing server 102 of the system 100. It will be apparent to persons having skill in the relevant art that the embodiment of the acquirer processing server 102 illustrated in FIG. 2 is provided as illustration only and may not be exhaustive to all possible configurations of the acquirer processing server 102 suitable for performing the functions as discussed herein. For example, the computer system 1200 illustrated in FIG. 12 and discussed in more detail below may be a suitable configuration of the acquirer processing server 102.

The acquirer processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 112 for the transmission of transaction messages that include sensitive financial data and information. In some instances, the receiving device 202 may also be configured to receive data from merchants 110, payment networks 112, issuer processing servers 104, blockchain systems 114, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by the merchant 110 using a suitable communication network, which may be forwarded via one or more intermediate entities, such as gateway processors, that are superimposed with payment details and additional transaction data associated with electronic transactions. The receiving device 202 may also be configured to receive transaction messages electronically transmitted by the payment network 112 via the payment rails. The receiving device 202 may be further configured to receive data signals superimposed with the opaque blockchain or one or more blocks included therein from the blockchain system 114 or other node associated with the opaque blockchain.

The acquirer processing server 102 may also include a communication module 204. The communication module 204 may be configured to transmit data between modules, engines, databases, memories, and other components of the acquirer processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the acquirer processing server 102 and external components of the acquirer processing server 102, such as externally connected databases, display devices, input devices, etc. The acquirer processing server 102 may also include a processing device. The processing device may be configured to perform the functions of the acquirer processing server 102 discussed herein as will be apparent to persons having skill in the relevant art. In some embodiments, the processing device may include and/or be comprised of a plurality of engines and/or modules specially configured to perform one or more functions of the processing device, such as a querying module 222, data generation module 210, hashing module 212, validation module 214, transaction processing module 216, etc. As used herein, the term "module" may be software or hardware particularly programmed to receive an input, perform one or more processes using the input, and provide an output. The input, output, and processes performed by various modules will be apparent to one skilled in the art based upon the present disclosure.

The acquirer processing server 102 may include a transaction database 206. The transaction database 206 may be configured to store a plurality of transaction profiles 208 using a suitable data storage format and schema. The transaction database 206 may be a relational database that utilizes structured query language for the storage, identification, modifying, updating, accessing, etc. of structured data sets stored therein. Each transaction profile 208 may be a structured data set configured to store data associated with an electronic transaction involving the acquirer processing server 102. Each transaction profile 208 may include at least a key-value pair comprising a hash value as a key and the transaction amount, currency code, and invoice identifier as the corresponding value. In some instances, a transaction profile 208 may include additional data associated with the related electronic transaction, such as data received from the merchant 110 and/or included in the transaction messages (e.g., authorization requests and responses) associated therewith, as well as data associated with the settlement of the related electronic transaction, such as confirmation of crediting of the related merchant transaction account.

The acquirer processing server 102 may include a querying module 222. The querying module 222 may be configured to execute queries on databases to identify information. The querying module 222 may receive one or more data values or query strings, and may execute a query string based thereon on an indicated database, such as the transaction database 206, to identify information stored therein. The querying module 222 may then output the identified information to an appropriate engine or module of the acquirer processing server 102 as necessary. The querying module 222 may, for example, execute a query on the transaction database 206 to identify a transaction profile 208 for use in confirming a processed electronic transaction for gross settlement. The transaction profile 208 may be identified via the use of the hash value, such as identified in a block in the opaque blockchain, or the invoice identifier, such as may be selected by the acquirer processing server 102 for settlement following the successful processing of the related electronic transaction. The acquirer processing server 102 may also include additional databases suitable for use in performing the functions discussed herein, such as databases for the storage of data associated with merchant transaction accounts for use in settlement of electronic transactions.

The acquirer processing server 102 may also include a data generation module 210. The data generation module 210 may be configured to generate data for use by the acquirer processing server 102 for performing the functions discussed herein. The data generation module 210 may receive data and instructions as input, may generate data or data messages based thereon, and may output the resulting data or data messages to one or more other engines or modules of the acquirer processing server 102. For instance, the data generation module 210 may receive payment details and transaction data as parsed from a data signal electronically transmitted by the merchant 110 and received by the receiving device 202 for an electronic transaction, and may generate an invoice identifier for the electronic transaction as well as a transaction message. The invoice identifier may be generated using one or more algorithms designed therefor, which may include the generation of a random or pseudo-random number for use as the invoice identifier. The transaction message may be formatted based on one or more standards, such as the ISO 8583 standard, and may include a plurality of data elements configured to store data as set forth in the standard(s), which may include a first data element configured to store a transaction amount, a second data element configured to store a currency code, and a third data element configured to store the invoice identifier.

The acquirer processing server 102 may also include a hashing module 212. The hashing module 212 may be configured to generate a hash value. The hashing module 212 may receive data as input, may generate a hash by applying hashing algorithms to the data, and may output the generated hash value to one or more other modules or engines of the acquirer processing server 102. The hash value may be generated for an electronic transaction and may be generated via the application of one or more hashing algorithms to data stored in an additional data element included in a transaction message received by the receiving device 202, which may be an authorization response originating from an issuer processing server 104 and transmitted via the payment network 112. The data stored in the additional element may comprise at least the transaction amount, currency code, and invoice identifier for the related electronic transaction, and may include additional data and/or may be formatted as agreed upon by the acquirer processing server 102 and issuer processing server 104.

The acquirer processing server 102 may further include a validation module 214. The validation module 214 may be configured to validate (e.g., confirm) an electronic transaction for settlement. The validation module 214 may receive one or more data inputs, may validate the input data, and may output a result of the validation, such as an indication of a successful or failed validation. The validation module 214 may be configured to receive a hash value stored in a block in the opaque blockchain, and may be configured to validate the hash value as correct based on a processed transaction. The correctness of the hash value may be based on its correspondence to a hash value generated for the same electronic transaction by the hashing module 212, which may be stored in a corresponding transaction profile 208 in the transaction database 206 (e.g., and identified via the querying module 222). For instance, the validation module 214 may validate that the hash value added to the opaque blockchain as generated by the issuer processing server 104 is equivalent to the hash value generated by the hashing module 212 for the same electronic transaction.

The acquirer processing server 102 may also include a transaction processing module 216. The transaction processing module 216 may be configured to perform additional functions associated with the processing electronic transactions as discussed herein and as will be apparent to persons having skill in the relevant art. For example, the transaction processing module 216 may be configured to credit or initiate the crediting of a transaction account associated with a merchant 110 for an electronic transaction for settlement thereof following validation of the transaction by the validation module 214. In another example, the transaction processing module 216 may be configured to perform additional services for an electronic transaction, such as fraud determinations, transaction control evaluation, etc.

The acquirer processing server 102 may also include a transmitting device 218. The transmitting device 218 may be configured to transmit data over one or more networks via one or more network protocols. In some embodiments, the transmitting device 218 may be configured to transmit data over the payment rails, such as using specially configured infrastructure associated with payment networks 112 for the transmission of transaction messages that include sensitive financial data and information, such as identified payment credentials. In some instances, the transmitting device 218 may be configured to transmit data to issuer processing servers 104, merchants 110, payment networks 112, blockchain systems 114, and other entities via alternative networks, such as the Internet. In some embodiments, the transmitting device 218 may be comprised of multiple devices, such as different transmitting devices for transmitting data over different networks, such as a first transmitting device for transmitting data over the payment rails and a second transmitting device for transmitting data over the Internet. The transmitting device 218 may electronically transmit data signals that have data superimposed that may be parsed by a receiving computing device. In some instances, the transmitting device 218 may include one or more modules for superimposing, encoding, or otherwise formatting data into data signals suitable for transmission.

The transmitting device 218 may be configured to electronically transmit transaction messages to the payment network 112 for processing. The transmitting device 218 may also be configured to electronically transmit return transaction messages or data signals superimposed with notifications associated with electronic transactions to merchants 110 via suitable communication networks. The transmitting device 218 may be further configured to electronically transmit data signals to the blockchain system 114 that are superimposed with requests for an opaque blockchain or blocks included therein, for use in confirmation of electronic transactions for settlement.

The acquirer processing server 102 may also include a memory 220. The memory 220 may be configured to store data for use by the acquirer processing server 102 in performing the functions discussed herein. The memory 220 may be configured to store data using suitable data formatting methods and schema and may be any suitable type of memory, such as read-only memory, random access memory, etc. The memory 220 may include, for example, encryption keys and algorithms, communication protocols and standards, data formatting standards and protocols, program code for modules and application programs of the processing device, and other data that may be suitable for use by the acquirer processing server 102 in the performance of the functions disclosed herein as will be apparent to persons having skill in the relevant art.

Issuer Processing Server

Figure 3:
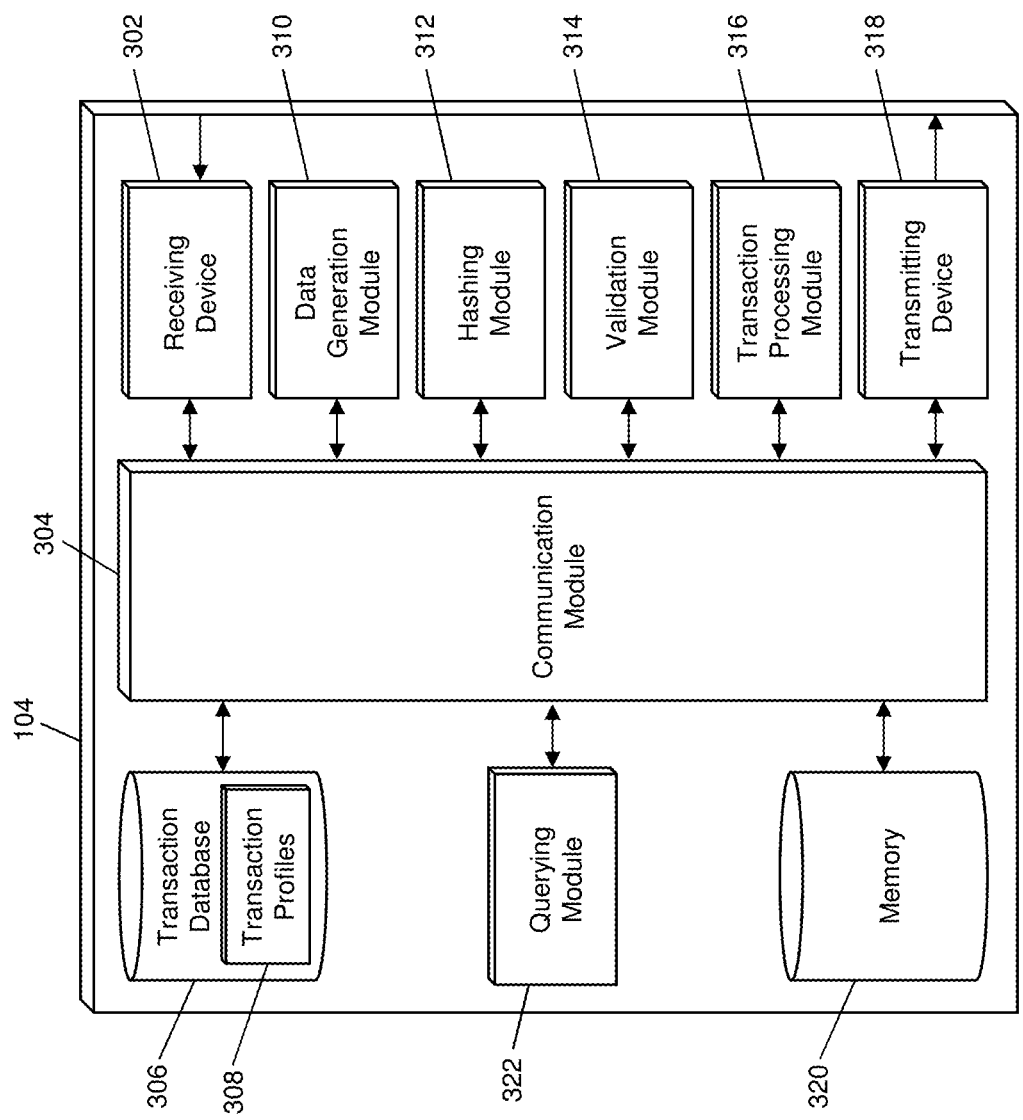
FIG. 3 is a block diagram illustrating the issuer processing server of FIG. 2 for the gross settlement of electronic transactions using an opaque blockchain in accordance with exemplary embodiments.

FIG. 3 illustrates an embodiment of the issuer processing server 104 of the system 100. It will be apparent to persons having skill in the relevant art that the embodiment of the issuer processing server 104 illustrated in FIG. 3 is provided as illustration only and may not be exhaustive to all possible configurations of the issuer processing server 104 suitable for performing the functions as discussed herein. For example, the computer system 1200 illustrated in FIG. 12 and discussed in more detail below may be a suitable configuration of the issuer processing server 104.

The issuer processing server 104 may include a receiving device 302. The receiving device 302 may be configured to receive data over one or more networks via one or more network protocols. In some embodiments, the receiving device 302 may be configured to receive data over the payment rails, such as using specially configured infrastructure associated with payment networks 112 for the transmission of transaction messages that include sensitive financial data and information. In some instances, the receiving device 302 may also be configured to receive data from acquirer processing servers 102, consumers 106, payment networks 112, blockchain systems 114, and other entities via alternative networks, such as the Internet. In some embodiments, the receiving device 302 may be comprised of multiple devices, such as different receiving devices for receiving data over different networks, such as a first receiving device for receiving data over payment rails and a second receiving device for receiving data over the Internet. The receiving device 302 may receive electronically data signals that are transmitted, where data may be superimposed on the data signal and decoded, parsed, read, or otherwise obtained via receipt of the data signal by the receiving device 302. In some instances, the receiving device 302 may include a parsing module for parsing the received data signal to obtain the data superimposed thereon. For example, the receiving device 302 may include a parser program configured to receive and transform the received data signal into usable input for the functions performed by the processing device to carry out the methods and systems described herein.

The receiving device 302 may be configured to receive transaction messages electronically transmitted by the payment network 112 via the payment rails. The receiving device 202 may also be configured to receive data signals from the blockchain system 114 that are superimposed with the opaque blockchain or blocks included therein.

The issuer processing server 104 may also include a communication module 304. The communication module 304 may be configured to transmit data between modules, engines, databases, memories, and other components of the issuer processing server 104 for use in performing the functions discussed herein. The communication module 304 may be comprised of one or more communication types and utilize various communication methods for communications within a computing device. For example, the communication module 304 may be comprised of a bus, contact pin connectors, wires, etc. In some embodiments, the communication module 304 may also be configured to communicate between internal components of the issuer processing server 104 and external components of the issuer processing server 104, such as externally connected databases, display devices, input devices, etc. The issuer processing server 104 may also include a processing device. The processing device may be configured to perform the functions of the issuer processing server 104 discussed herein as will be apparent to persons having skill in the relevant art. In some embodiments, the processing device may include and/or be comprised of a plurality of engines and/or modules specially configured to perform one or more functions of the processing device, such as a querying module 322, data generation module 310, hashing module 312, validation module 314, transaction processing module 316, etc. As used herein, the term "module" may be software or hardware particularly programmed to receive an input, perform one or more processes using the input, and provide an output. The input, output, and processes performed by various modules will be apparent to one skilled in the art based upon the present disclosure.

The issuer processing server 104 may include a transaction database 306. The transaction database 306 may be configured to store a plurality of transaction profiles 308 using a suitable data storage format and schema. The transaction database 306 may be a relational database that utilizes structured query language for the storage, identification, modifying, updating, accessing, etc. of structured data sets stored therein. Each transaction profile 308 may be a structured data set configured to store data associated with an electronic transaction involving the issuer processing server 104. Each transaction profile 308 may include at least a key-value pair comprising a hash value as a key and the transaction amount, currency code, and invoice identifier as the corresponding value. In some instances, a transaction profile 308 may include additional data associated with the related electronic transaction, such as data included in the transaction messages (e.g., authorization requests and responses) associated therewith, as well as data associated with the settlement of the related electronic transaction, such as confirmation of debiting of the related consumer transaction account. The issuer processing server 104 may also include additional databases suitable for use in performing the functions discussed herein, such as databases for the storage of data associated with consumer transaction accounts for use in settlement of electronic transactions.

The issuer processing server 104 may include a querying module 322. The querying module 322 may be configured to execute queries on databases to identify information. The querying module 322 may receive one or more data values or query strings, and may execute a query string based thereon on an indicated database, such as the transaction database 306, to identify information stored therein. The querying module 322 may then output the identified information to an appropriate engine or module of the issuer processing server 104 as necessary. The querying module 322 may, for example, execute a query on the transaction database 306 to identify a transaction profile 308 for use in confirming a processed electronic transaction for gross settlement. The transaction profile 308 may be identified via the use of the hash value, such as identified in a block in the opaque blockchain, or the invoice identifier, such as may be selected by the issuer processing server 104 for settlement following the successful processing of the related electronic transaction.

The issuer processing server 104 may also include a data generation module 310. The data generation module 310 may be configured to generate data for use by the issuer processing server 104 for performing the functions discussed herein. The data generation module 310 may receive data and instructions as input, may generate data or data messages based thereon, and may output the resulting data or data messages to one or more other engines or modules of the issuer processing server 104. For instance, the data generation module 310 may receive a transaction message originating from the acquirer processing server 102 and received by the receiving device 302 as input. The transaction message may be formatted based on one or more standards, such as the ISO 8583 standard, and may include a plurality of data elements configured to store data as set forth in the standard(s), which may include a first data element configured to store a transaction amount, a second data element configured to store a currency code, and a third data element configured to store the invoice identifier.

The data generation module 310 may be configured to generate a return transaction message, which may be a modification of the received transaction message that also include a data element configured to store a response code and an additional data element configured to store at least the transaction amount, currency code and invoice identifier. In some instances, the data generation module 310 may generate a data set for storage in the additional data element that includes the transaction amount, currency code, and invoice identifier, which may also include additional data or may be formatted as agreed upon by the issuer processing server 104 and the acquirer processing server 102. In some instances, the data stored in the corresponding data elements of the return transaction message, such as the response code, may be based on instructions or data received by the data generation module 310 from another engine or module of the issuer processing server 104, such as a transaction processing module 316.

The issuer processing server 104 may also include a hashing module 312. The hashing module 312 may be configured to generate a hash value. The hashing module 312 may receive data as input, may generate a hash by applying hashing algorithms to the data, and may output the generated hash value to one or more other modules or engines of the issuer processing server 104. The hash value may be generated for an electronic transaction and may be generated via the application of one or more hashing algorithms to data stored in the additional data element included in the generated return transaction message generated by the data generation module 310. The data stored in the additional element may comprise at least the transaction amount, currency code, and invoice identifier for the related electronic transaction, and may include additional data and/or may be formatted as agreed upon by the acquirer processing server 102 and issuer processing server 104.

The issuer processing server 104 may further include a validation module 314. The validation module 314 may be configured to validate (e.g., confirm) an electronic transaction for settlement. The validation module 314 may receive one or more data inputs, may validate the input data, and may output a result of the validation, such as an indication of a successful or failed validation. The validation module 314 may be configured to receive a hash value stored in a block in the opaque blockchain, and may be configured to validate the hash value as correct based on a processed transaction. The correctness of the hash value may be based on its correspondence to a hash value generated for the same electronic transaction by the hashing module 312, which may be stored in a corresponding transaction profile 308 in the transaction database 306 (e.g., and identified via the querying module 322). For instance, the validation module 314 may validate that the hash value added to the opaque blockchain as generated by the issuer processing server 104 is equivalent to the hash value generated by the hashing module 312 for the same electronic transaction.

The issuer processing server 104 may also include a transaction processing module 316. The transaction processing module 316 may be configured to perform additional functions associated with the processing electronic transactions as discussed herein and as will be apparent to persons having skill in the relevant art. For example, the transaction processing module 316 may be configured to debit or initiate the debiting of a transaction account associated with a consumer 106 for an electronic transaction for settlement thereof following validation of the transaction by the validation module 314. In another example, the transaction processing module 316 may be configured to perform additional services for an electronic transaction, such as fraud determinations, transaction control evaluation, etc.

The issuer processing server 104 may also include a transmitting device 318. The transmitting device 318 may be configured to transmit data over one or more networks via one or more network protocols. In some embodiments, the transmitting device 318 may be configured to transmit data over the payment rails, such as using specially configured infrastructure associated with payment networks 112 for the transmission of transaction messages that include sensitive financial data and information, such as identified payment credentials. In some instances, the transmitting device 318 may be configured to transmit data to acquirer processing servers 102, consumer 106, payment networks 112, blockchain systems 114, and other entities via alternative networks, such as the Internet. In some embodiments, the transmitting device 318 may be comprised of multiple devices, such as different transmitting devices for transmitting data over different networks, such as a first transmitting device for transmitting data over the payment rails and a second transmitting device for transmitting data over the Internet. The transmitting device 318 may electronically transmit data signals that have data superimposed that may be parsed by a receiving computing device. In some instances, the transmitting device 318 may include one or more modules for superimposing, encoding, or otherwise formatting data into data signals suitable for transmission.

The transmitting device 318 may be configured to electronically transmit transaction messages to the payment network 112 for processing, such as return transaction messages generated by the data generation module 210. The transmitting device 318 may also be configured to electronically transmit hash values generated by the hashing module 312 to blockchain systems 114 for inclusion in the opaque blockchain. The transmitting device 318 may be further configured to electronically transmit data signals to the blockchain system 114 that are superimposed with requests for an opaque blockchain or blocks included therein, for use in confirmation of electronic transactions for settlement.

The issuer processing server 104 may also include a memory 320. The memory 320 may be configured to store data for use by the issuer processing server 104 in performing the functions discussed herein. The memory 320 may be configured to store data using suitable data formatting methods and schema and may be any suitable type of memory, such as read-only memory, random access memory, etc. The memory 320 may include, for example, encryption keys and algorithms, communication protocols and standards, data formatting standards and protocols, program code for modules and application programs of the processing device, and other data that may be suitable for use by the issuer processing server 104 in the performance of the functions disclosed herein as will be apparent to persons having skill in the relevant art.

In some embodiments, the issuer processing server 104 may be configured to operate as the blockchain system 114 for the addition of hash values into the opaque blockchain via inclusion in new blocks. In such an embodiment, the receiving device 302 may be configured to receive data signals superimposed with hash values from additional issuer processing servers 104, may utilize hash values generated internally via the hashing module 312, or a combination thereof. The data generation module 310 may be configured to generate a new block for inclusion in the opaque blockchain.

The new block may comprise at least a header and plurality of hash values related to processed electronic transactions. The header may include at least a reference identifier referring to a preceding block in the opaque blockchain and a proof-of-work value. The reference identifier referring to the preceding block may be identified via the execution of a query by the querying module 322 on the opaque blockchain for identification thereof. The reference identifier may be included in a header of the preceding block, or may be generated using the header or data included therein via application thereof to a hashing algorithm by the hashing module 312. The preceding block may be identified based on its position in the blockchain or data included in the header, such as a generation or inclusion date included therein. The proof-of-work value may be generated by the data generation module 310, and may be generated as a solution to a complex mathematical problem, whose difficulty level may be set by the issuer processing server 104, acquirer processing server 102, blockchain system 114, one or more additional nodes associated with the opaque blockchain, or a combination thereof.

Once the new block is generated, the block may be added to the opaque blockchain. In some instances, the memory 320 may be configured to store the opaque blockchain, and the block may be added via the execution of a query suitable therefor by the querying module 322 of the issuer processing server 104. In other instances, the transmitting device 318 may electronically transmit the block to one or more nodes associated with the opaque blockchain for confirmation thereof prior to being appended to the opaque blockchain.

Figure 4A:
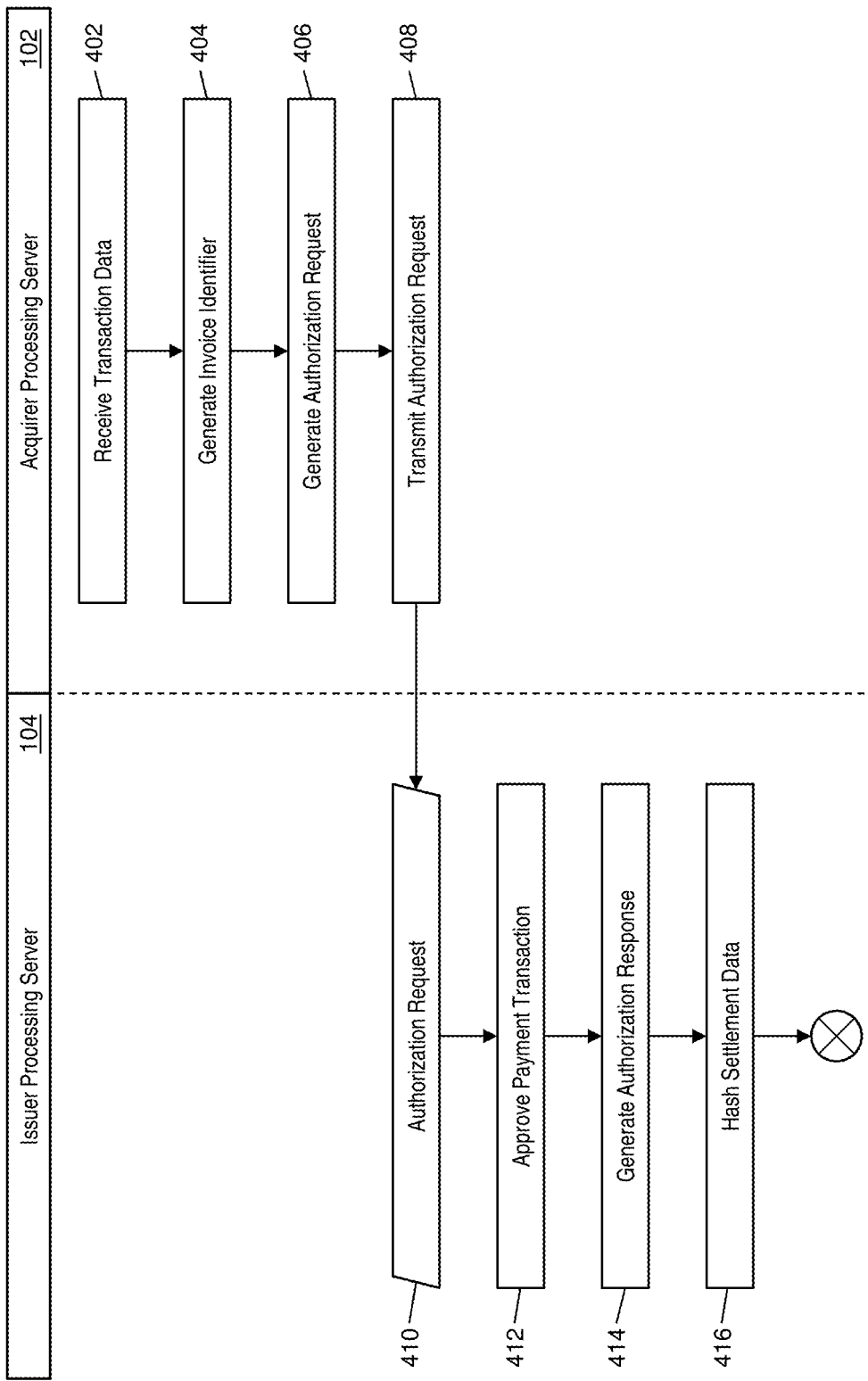
FIGS. 4A and 4B are a flow diagram illustrating a process for the confirmation and gross settlement of an electronic transaction using an opaque blockchain in accordance with exemplary embodiments.
Figure 4B:
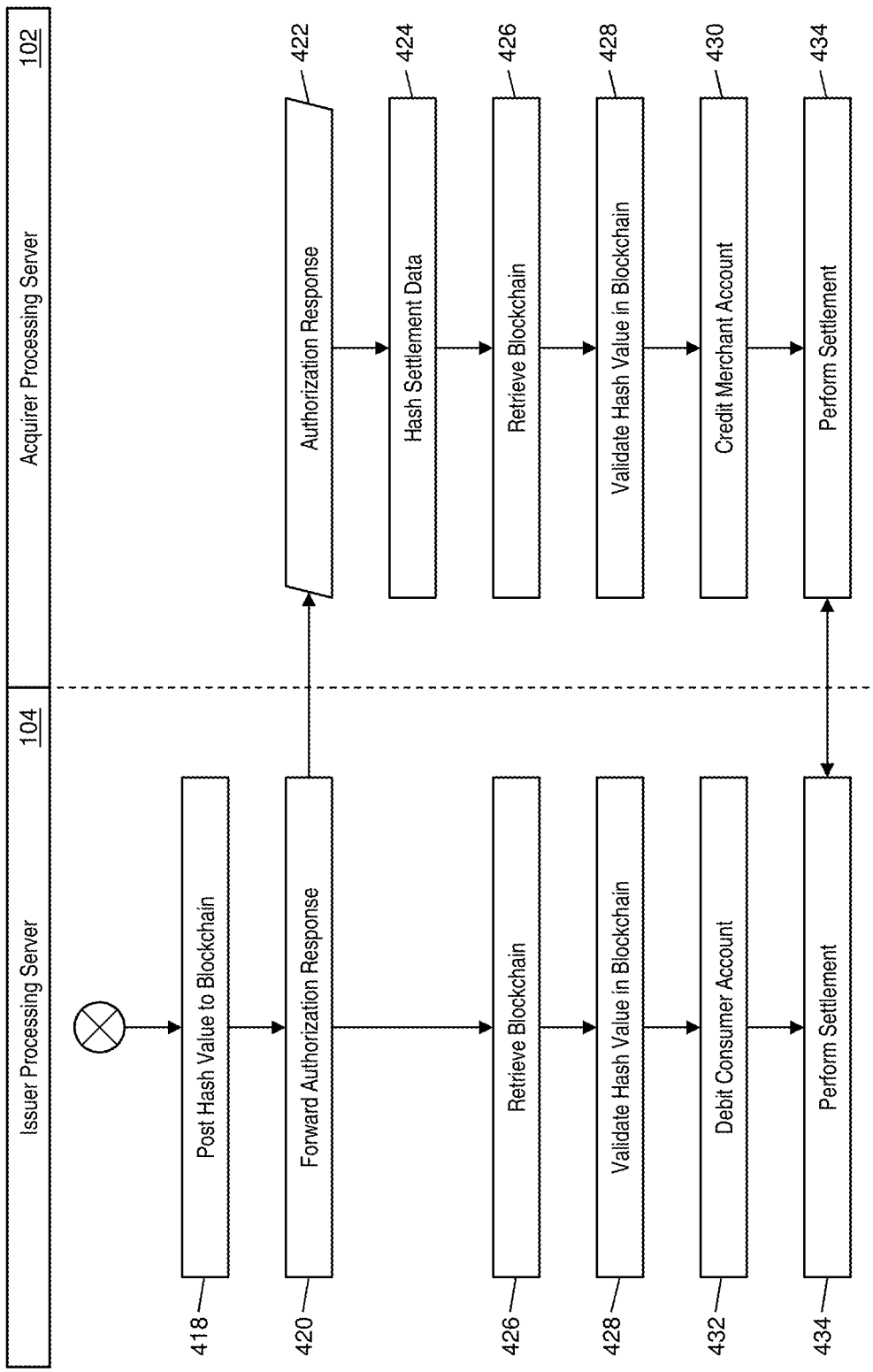

Process for Confirming an Electronic Transaction Using an Opaque Blockchain for Settlement FIGS. 4A and 4B illustrate a process for conducting and confirming an electronic transaction via the use of an opaque blockchain for settlement thereof.

In step 402, the receiving device 202 of the acquirer processing server 102 may receive transaction data from a merchant 110. The transaction data may include payment details and additional transaction data related to an electronic transaction involving the merchant 110 and a consumer 106. The transaction data may be electronically transmitted via a suitable communication network, and may be transmitted directly from the merchant 110 or through one or more intermediate entities, such as gateway processors.

In step 404, the data generation module 210 of the acquirer processing server 102 may generate an invoice identifier for the electronic transaction. The invoice identifier may be a value unique to the electronic transaction, such as a randomly generated number or alphanumeric value that has not been previously generated or otherwise identified for an electronic transaction. In step 406, the data generation module 210 may generate a transaction message for the electronic transaction. The transaction message may be formatted based on one or more standards, such as the ISO 8583 standard, and include a message type indicator indicative of an authorization request and a plurality of data elements including at least a first data element configured to store a transaction amount, a second data element configured to store a currency code, and a third data element configured to store the invoice identifier.

In step 408, the transmitting device 218 of the acquirer processing server 102 may electronically transmit the authorization request to the issuer processing server 104 via the payment network 112 using the payment rails. In step 410, the receiving device 302 of the issuer processing server 104 may receive the authorization request from the payment network 112 using the payment rails. In step 412, the transaction processing module 316 may perform traditional processes in approving the electronic payment transaction, such as by determining that there is a low likelihood of fraud for the transaction and that the transaction account presented for payment has a sufficient balance to cover the transaction amount for the transaction.

In step 414, the data generation module 310 of the issuer processing server 104 may generate a return transaction message for the electronic transaction, such as by generating a new data message or modifying the received authorization request accordingly. The return transaction message may be formatted using the same one or more standards used in formatting the authorization request and include a message type indicator indicative of an authorization response and a plurality of data elements, including a data element configured to store a response code indicative of approval and an additional data element configured to store at least the transaction amount, currency code, and invoice identifier, which may include additional data and/or be formatted as agreed upon by the acquirer processing server 102 and issuer processing server 104.

In step 416, the hashing module 312 of the issuer processing server 104 may generate a hash value for the electronic transaction. The hash value may be generated by the application of one or more hashing algorithms to the data stored in the additional data element included in the generated authorization response. In step 418, the transmitting device 318 of the issuer processing server 104 may electronically transmit the hash value to the blockchain system 114 for posing to the opaque blockchain. In some embodiments, the modules and engines of the issuer processing server 104 may be configured to generate a new block for the opaque blockchain that includes the hash value using the methods discussed herein for posting to the opaque blockchain.

In step 420, the transmitting device 318 of the issuer processing server 104 may electronically transmit the authorization response to the acquirer processing server 102 via the payment network 112 using the payment rails. In some embodiments, step 420 may be performed prior to or concurrently with steps 416 and 418. In step 422, the receiving device 202 of the acquirer processing server 102 may receive the authorization response from the payment network 112 via the payment rails. The acquirer processing server 102 may then perform any additional steps necessary as performed in traditional transaction processing, such as illustrated in the process 1100 of FIG. 11 and discussed below. In step 424, the hashing module 212 of the acquirer processing server 102 may generate a hash value by applying the one or more hashing algorithms used by the issuer processing server 104 to the data stored in the additional data element included in the received authorization response, which may include at least the transaction amount, currency code, and invoice identifier.

In step 426, the receiving devices 202 and 302 of the acquirer processing server 102 and issuer processing server 104, respectively, may each receive the opaque blockchain or one or more blocks included therein from the blockchain system 114, including a block that includes the hash value posted to the opaque blockchain as provided by the issuer processing server 104. In step 428, the validation modules 214 and 314 of the acquirer processing server 102 and issuer processing server 104, respectively, may validate the hash value included in the block of the opaque blockchain as being equivalent to the value generated by the respective data generation modules 210 and 310 using the data stored in the additional data element of the authorization response. Upon successful validation, in step 430, the transaction processing module 216 of the acquirer processing server 102 may credit the transaction account associated with the merchant 110 involved in the electronic transaction for the transaction amount. In step 432, the transaction processing module 316 of the issuer processing server 104 may debit the transaction account associated with the consumer 106 involved in the electronic transaction for the transaction amount. In step 434, the acquirer processing server 102 and issuer processing server 104 may perform any additional actions suitable for the further settlement of the electronic transaction, such as by transferring the transaction amount from the issuing financial institution to the acquiring financial institution, or updating account records accordingly.

Figure 5:
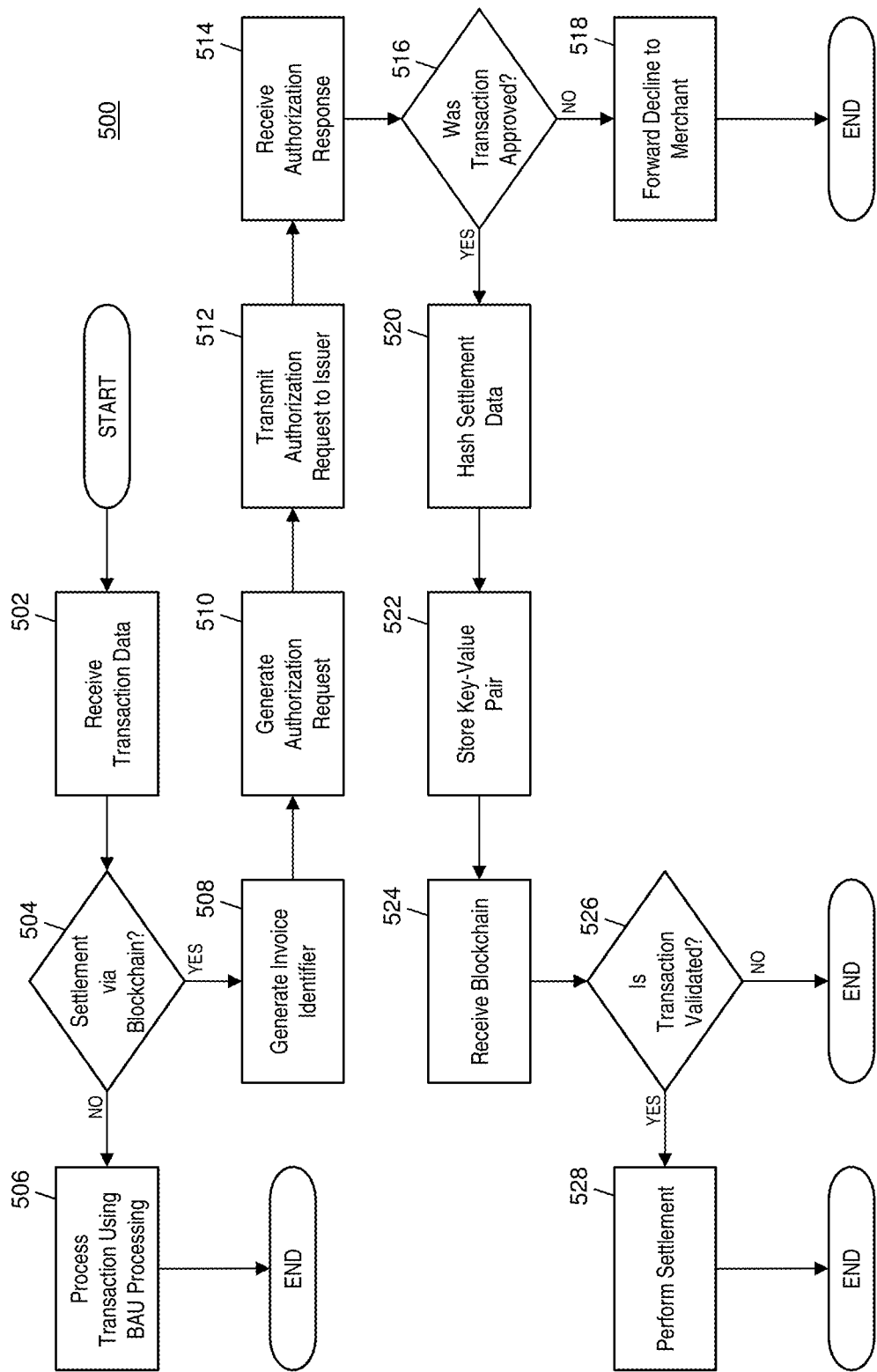
FIG. 5 is a flow diagram illustrating a process for the gross settlement of an electronic transaction by the acquirer processing server of FIG. 2 using an opaque blockchain in accordance with exemplary embodiments.

Acquirer Processing and Confirmation of Electronic Transactions Using an Opaque Blockchain FIG. 5 illustrates a process 500 for the confirmation of an electronic transaction and settlement thereof for an acquiring financial institution via the use of an opaque blockchain.

In step 502, the receiving device 202 of the acquirer processing server 102 may receive transaction data for an electronic transaction from a merchant 110, which may include payment details and additional transaction data, including at least a transaction amount and a currency code, and may be transmitted via one or more gateway processors or other intermediate entities. In step 504, the transaction processing module 216 of the acquirer processing server 102 may determine if the transaction is to be settled via the opaque blockchain. The determination may be based on account preferences or settings for the transaction account associated with the merchant 110, criteria as applied to the transaction data received from the merchant 110, or other suitable criteria. For example, the acquirer processing server 102 may determine that any transactions under a specific transaction amount or involving a specific merchant industry may be settled via the opaque blockchain.

If the electronic transaction is not to be settled via the opaque blockchain, then, in step 506, the transaction processing module 216 and other modules and engines of the acquirer processing server 102 may proceed to process the electronic transaction using traditional methods, such as illustrated in the process 1100 of FIG. 11 and discussed in more detail below. If the electronic transaction is to be settled using the opaque blockchain, then, in step 508, the data generation module 210 of the acquirer processing server 102 may generate an invoice identifier that is uniquely associated with the electronic transaction. In step 510, the data generation module 210 of the acquirer processing server 102 may generate a transaction message for the electronic transaction, where the transaction message is formatted based on one or more standards, such as the ISO 8583 standard, and includes a message type indicator indicative of an authorization request and a plurality of data elements including at least a first data element configured to store the transaction amount, a second data element configured to store the currency code, and a third data element configured to store the invoice identifier.

In step 512, the transmitting device 218 of the acquirer processing server 102 may electronically transmit the authorization request to the issuing financial institution involved in the electronic transaction via the payment network 112 using the payment rails. In step 514, the receiving device 202 of the acquirer processing server 102 may receive an authorization response from the issuing financial institution via the payment network 112 using the payment rails. The authorization response may be a return transaction message formatted using the same one or more standards that includes a message type indicator indicative of an authorization response and include a plurality of data elements including a data element configured to store a response code and an additional data element configured to store additional data, comprising at least the transaction amount, currency code, and invoice identifier, which may include additional data and/or be formatted as agreed upon by the acquirer processing server 102 and the issuer processing server 104.

In step 516, the transaction processing module 216 of the acquirer processing server 102 may determine if the electronic transaction was approved by the issuing financial institution. The determination may be based on the response code stored in the corresponding data element included in the authorization response, which may indicate if the electronic transaction was approved or declined by the issuing financial institution. If the electronic transaction was declined, then, in step 518, the transmitting device 218 of the acquirer processing server 102 may electronically transmit a data signal superimposed with a notification indicating that the transaction was declined to the merchant 110. In some instances, the authorization response may be transmitted as the notification.

If, in step 516, the transaction processing module 216 of the acquirer processing server 102 determines that the electronic transaction was approved, then, in step 520, the hashing module 212 of the acquirer processing server 102 may generate a hash value for the electronic transaction for use in the settlement. The hash value may be generated by the application of one or more hashing algorithms to the data stored in the additional data element included in the received authorization response. In step 522, a key-value pair may be stored in a transaction profile 208 of the transaction database 206 of the acquirer processing server 102, such as via execution of a query suitable therefor by a querying module 222 of the acquirer processing server 102. The key-value pair may include the hash value as a key and the data used in the generation thereof as the corresponding value in the pair.

In step 524, the receiving device 202 of the acquirer processing server 102 may receive the opaque blockchain from the blockchain system 114 using a suitable communication network. The opaque blockchain, discussed in more detail below, may include a plurality of blocks. Each block may include at least a header and one or more transaction values. The header may include at least a reference identifier and a proof-of-work value, and may also include a transaction counter indicative of a number of transaction values in the block. Each transaction value may be a hash value generated for an electronic transaction using the transaction amount, currency code, and invoice identifier for that transaction.

In step 526, the validation module 214 of the acquirer processing server 102 may determine if the electronic transaction is validated based on the opaque blockchain. The validation may include determining if a transaction value is included in the blockchain that corresponds directly to the hash value generated by the hashing module 212 in step 520. The inclusion of such a transaction value in the blockchain may indicate that the issuing financial institution received and hashed the same transaction amount, currency code, and invoice identifier, thus implying agreement to the values for settlement of the transaction. If the validation is unsuccessful, then settlement may not be performed. If the validation is successful, then, in step 528, the transaction processing module 216 of the acquirer processing server 102 may perform any actions suitable for settlement of the transaction, such as the crediting of the transaction amount to the transaction account associated with the merchant 110 and the receipt of the transaction amount from the issuing financial institution.

Figure 6:
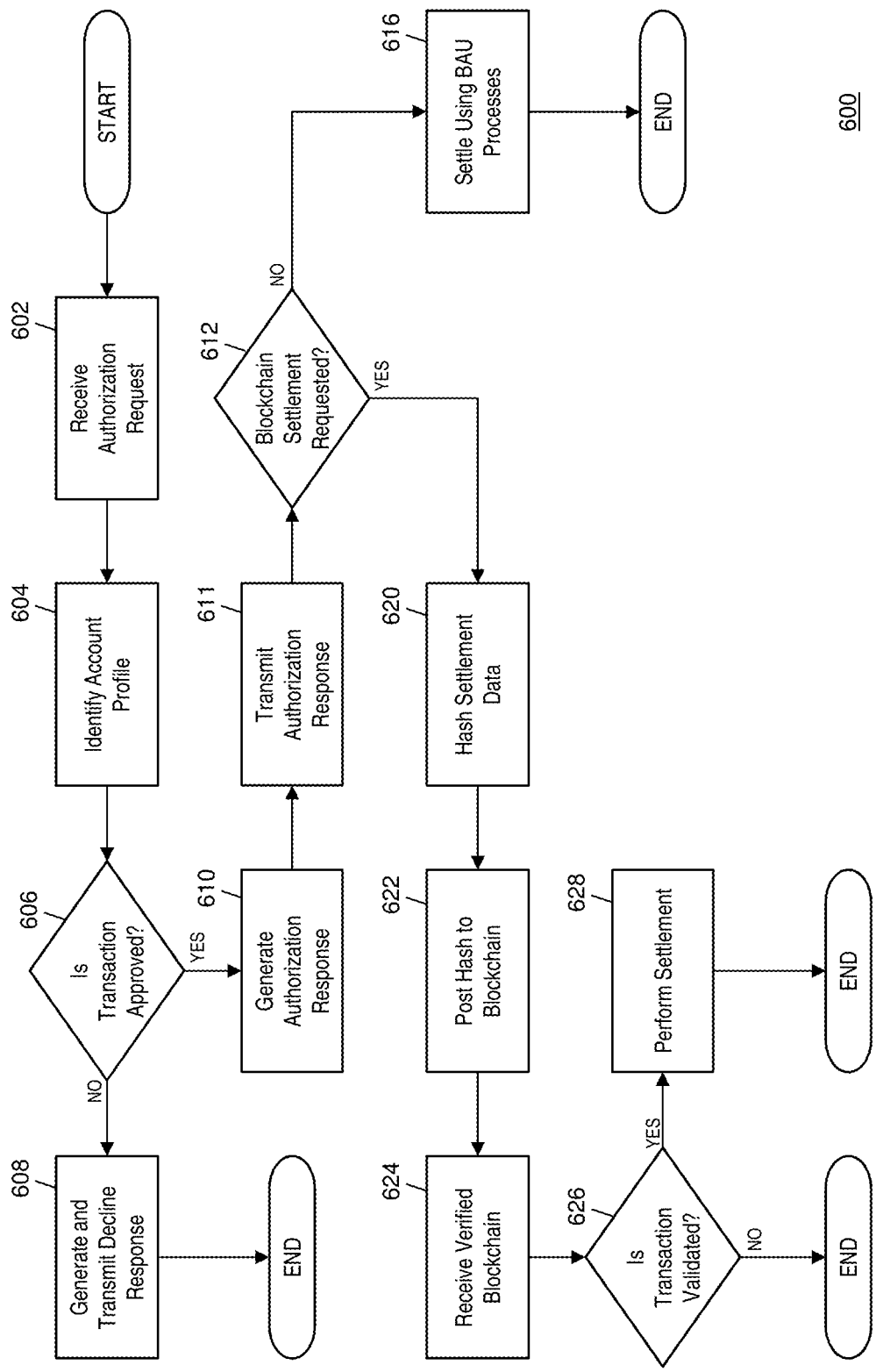
FIG. 6 is a flow diagram illustrating a process for the gross settlement of an electronic transaction by the issuer processing server of FIG. 3 using an opaque blockchain in accordance with exemplary embodiments.

Issuer Processing and Confirmation of Electronic Transactions Using an Opaque Blockchain FIG. 6 illustrates a process 600 for the confirmation of an electronic transaction and settlement thereof for an issuing financial institution via the use of an opaque blockchain.

In step 602, the receiving device 302 of the issuer processing server 104 may receive an authorization request for an electronic transaction. The authorization request may be received from a payment network 112 via the payment rails, and may originate from an acquirer processing server 102 associated with a merchant 110 involved in the electronic transaction. The authorization request may be a transaction message formatted pursuant to one or more standards, such as the ISO 8583 standard, and include a message type indicator indicative of an authorization request and a plurality of data elements, including at least a first data element configured to store a transaction amount, a second data element configured to store a currency code, and a third data element configured to store an invoice identifier.

In step 604, a transaction processing module 316 of the issuer processing server 104 may identify an account profile for a transaction account associated with a consumer 106 involved in the electronic transaction. The account profile may be identified via the querying of a corresponding database by a querying module 322 of the issuer processing server 104 using a primary account number or other data included in corresponding data elements included in the authorization response. In step 606, the transaction processing module 316 of the issuer processing server 104 may determine if the transaction is approved. Approval of the transaction may be based on traditional methods, which may take into account fraud considerations, transaction controls, account balances and credit limits for the transaction account, etc. If the transaction is not approved, then, in step 608, the data generation module 310 of the issuer processing server 104 may generate an authorization response indicating that the transaction is declined, which may be forwarded to the payment network 112, using traditional methods and systems.

If the electronic transaction is to be approved, then, in step 610 the data generation module 310 issuer processing server 104 may generate an authorization response indicating approval. The authorization response may be a newly generated transaction message, or a modification of the received authorization request, that includes a message type indicator indicative of an authorization response and a plurality of data elements including at least a data element configured to store a response code indicating that the transaction was approved and an additional data element configured to store the transaction amount, currency code, and invoice identifier, which may also include and/or be formatted as agreed upon by the issuer processing server 104 and acquirer processing server 102. In some instances, the additional data element may be a data element reserved for private use as set forth in the associated standard(s). In step 611, the transmitting device 318 of the issuer processing server 104 may electronically transmit the authorization response to the payment network 112 for additional processing of the electronic transaction.

In step 612, the transaction processing module 316 issuer processing server 104 may determine if the electronic transaction is to be settled via the opaque blockchain. In some instances, the determination may be based on data stored in a corresponding data element included in the received authorization response, such as a value set by the acquirer processing server 102 indicating the method for settlement. In other instances, the determination may be based on additional transaction data, such as the transaction amount, merchant data, consumer data, etc. If the transaction is not to be settled using the blockchain, then, in step 616, the transaction processing module 316 may settle the transaction using traditional methods involving the payment network 112.

If the transaction is to be settled with the blockchain, then, in step 620, the hashing module 312 of the issuer processing server 104 may generate a hash value for the electronic transaction. The hash value may be generated via the application of one or more hashing algorithms to the data stored in the additional data element included in the generated authorization response. In some embodiments, step 612 may be performed prior to step 611 such that the authorization response may not include the data stored in the additional data element used to generate the hash value if the electronic transaction is to be settled using business-as-usual (BAU) processes.

In step 622, the generated hash value may be posted to the opaque blockchain associated with the blockchain system 114. In some embodiments, the posting of the hash value may include electronically transmitting the hash value to a blockchain system 114 associated with the opaque blockchain using the transmitting device 318. In other embodiments, the issuer processing server 104 may be configured to generate a new block for the opaque blockchain for inclusion therein using the methods discussed herein. In step 624, the receiving device 302 of the issuer processing server 104 may receive the opaque blockchain from the blockchain system 114 that includes a new block including the electronic transaction's hash value following verification of the opaque blockchain by one or more nodes associated therewith.

In step 626, the validation module 314 of the issuer processing server 104 may determine if the electronic transaction is successfully validated based on the opaque blockchain. The validation may be based on the inclusion of a hash value in a block of the opaque blockchain that corresponds to the hash value generated for the electronic transaction in step 620 using the data stored in the additional data element included in the authorization response. If the validation is unsuccessful, then the process may be completed and settlement may not occur. If validation is successful, then, in step 628, the transaction processing module 316 issuer processing server 104 may perform the settlement, which may include the debiting of a transaction account used in the electronic transaction for the transaction amount and the transmission of funds to the acquiring financial institution.

Opaque Blockchain

Figure 7:
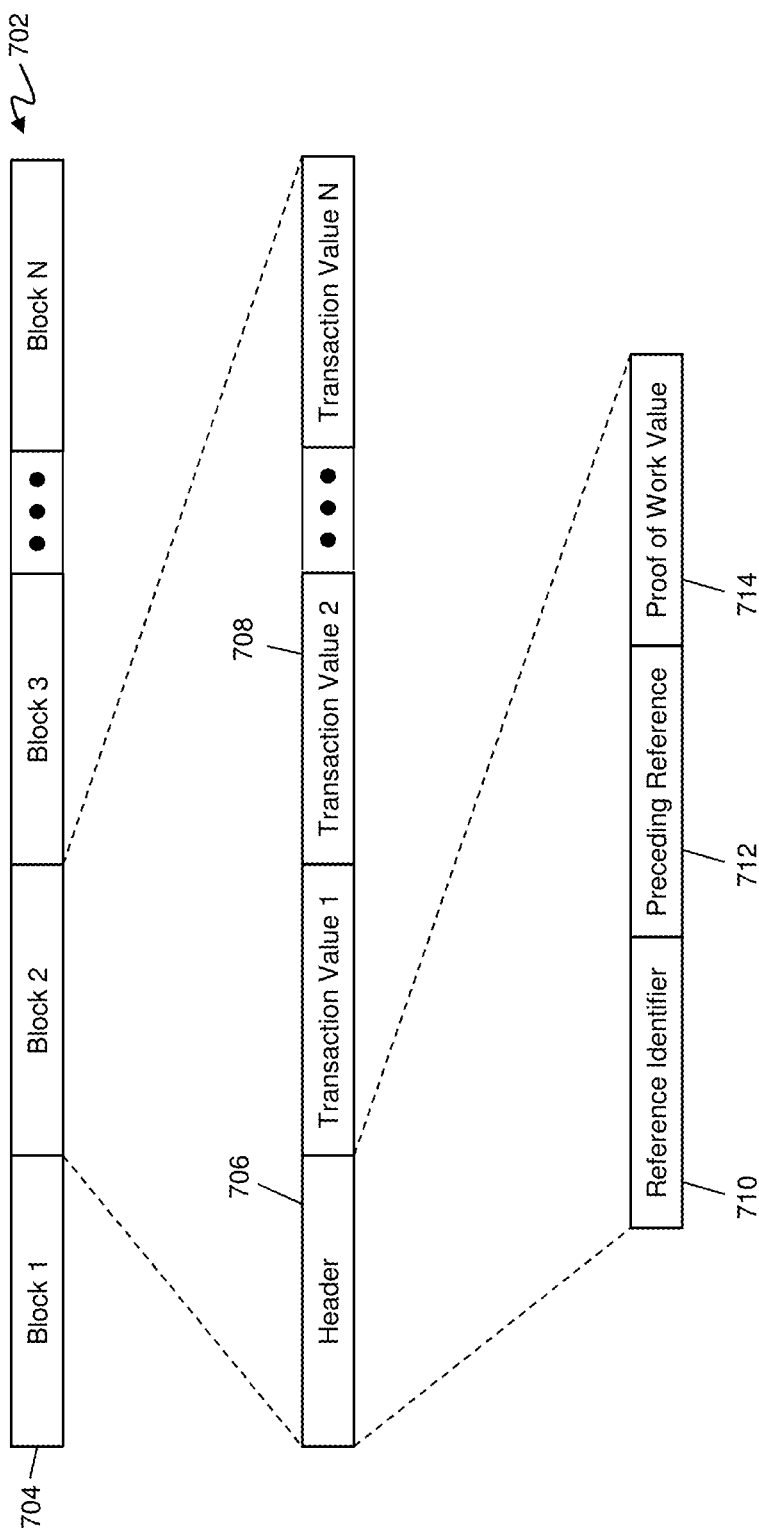
FIG. 7 is a block diagram illustrating an opaque blockchain used in the gross settlement of electronic transactions in accordance with exemplary embodiments.

FIG. 7 illustrates a configuration of the opaque blockchain used herein for the confirmation of electronic transactions for settlement. It will be apparent to persons having skill in the relevant art that the configuration illustrated in FIG. 7 and discussed herein is provided as an illustration only, and that additional configures of the opaque blockchain may be suitable for performing the functions discussed herein.

As illustrated in FIG. 7, an opaque blockchain 702 may be comprised of a plurality of blocks 704. Each block 704 comprising the opaque blockchain 702 may be comprised of a header 706 and a plurality of transaction values 708. Each transaction value 708 may correspond to a hash value generated for an electronic transaction. The hash value may be generated via the application of one or more hashing algorithms to data associated with the related electronic transaction including at least a transaction amount, currency code, and invoice identifier. The hash value may be generated using one-way hashes such that only entities (e.g., the acquiring and issuing financial institutions involved in the related electronic transaction) in possession of the correct set of data used to generate the hash value may understand what the hash value represents.

Each header 706 may include data associated with the respective block 704. A header 706 may include, for example, a reference identifier 710. The reference identifier 710 may be a unique value associated with the respective block 704 suitable for use in the identification thereof. A header 706 may also, or alternatively, include a preceding reference 712. The preceding reference 712 may be an identifier associated with a preceding block in the opaque blockchain 702. In some instances, the preceding reference 712 may be a hash of the header 706 for the preceding block. In such instances, the header 706 may not include a reference identifier 710 as the respective block 704 may be identified via a hash of the header 706.

A header 706 may also include a proof of work value 714. The proof of work value 714 may be a solution to a complex mathematical problem. The complex mathematical problem may be of a difficulty level determined be one or more nodes or blockchain systems 114 associated with the opaque blockchain 702 that is suitable for the continued generation and addition of blocks 704 to the opaque blockchain 702. For example, the complex mathematical problem may be a problem designed such that a solution is determined near a predetermined interval of time, such as every ten minutes. In some embodiments, a header 706 may also include a transaction counter, which may be indicative of the number of transaction values 708 in the respective block 704.

Figure 8:
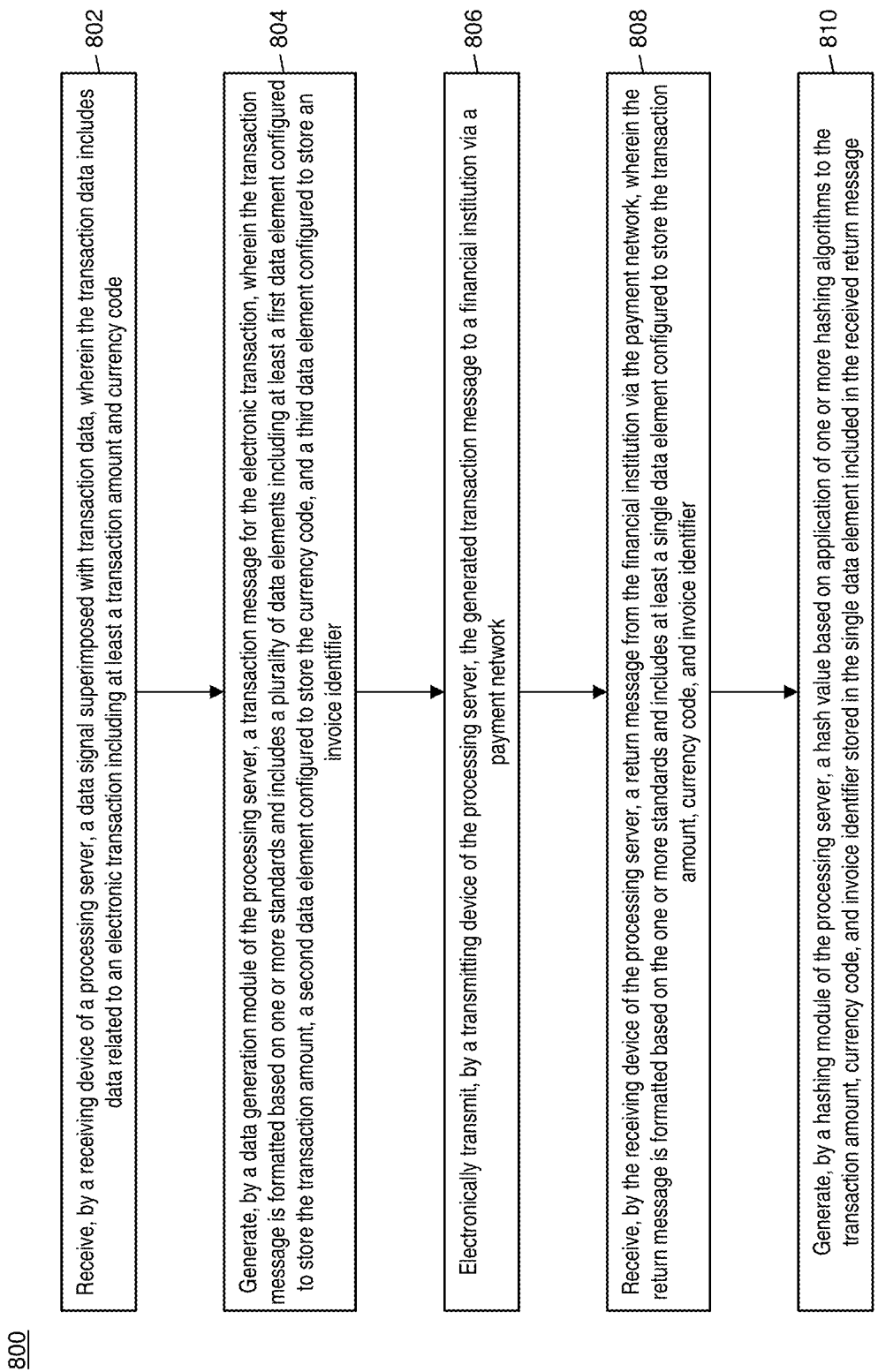
FIGS. 8 and 9 are flow charts illustrating exemplary methods for confirmation of an electronic transaction using a blockchain in accordance with exemplary embodiments.

First Exemplary Method for Confirmation of an Electronic Transaction Using a Blockchain FIG. 8 illustrates a method 800 for the confirmation of an electronic transaction by an acquiring financial institution for settlement via the use of an opaque blockchain.

In step 802, a data signal superimposed with transaction data may be received by a receiving device (e.g., the receiving device 202) of a processing server (e.g., the acquirer processing server 102), wherein the transaction data includes data related to an electronic transaction including at least a transaction amount and currency code. In step 804, a transaction message may be generated by a data generation module (e.g., the data generation module 210) of the processing server for the electronic transaction, wherein the transaction message is formatted based on one or more standards and includes a plurality of data elements including at least a first data element configured to store the transaction amount, a second data element configured to store the currency code, and a third data element configured to store an invoice identifier.

In step 806, the generated transaction message may be electronically transmitted by a transmitting device (e.g., the transmitting device 218) of the processing server to a financial institution via a payment network (e.g., the payment network 112). In step 808, a return message may be received by the receiving device of the processing server from the financial institution via the payment network, wherein the return message is formatted based on the one or more standards and includes at least a single data element configured to store the transaction amount, currency code, and invoice identifier. In step 810, a hash value may be generated by a hashing module (e.g., the hashing module 212) of the processing server based on application of one or more hashing algorithms to the transaction amount, currency code, and invoice identifier stored in the single data element included in the received return message.

In one embodiment, the method 800 may further include: receiving, by the receiving device of the processing server, a blockchain (e.g., the opaque blockchain 702), wherein the blockchain includes a plurality of blocks (e.g., blocks 704) and, for each block of the plurality of blocks, a header (e.g., header 706) and one or more transaction values (e.g., transaction values 708); and validating, by a validation module (e.g., the validation module 214) of the processing server, the electronic transaction based on existing of a transaction value for a block included in the plurality of blocks included in the received blockchain that corresponds to the generated hash value. In some embodiments, the generated transaction message may further include a message type indicator indicative of an authorization request, and the received return message may further include a message type indicator indicative of an authorization response In one embodiment, the method 800 may also include generating, by the data generation module of the processing server, the invoice identifier based on at least additional data included in the transaction data superimposed on the received data signal. In some embodiments, the third data element may be reserved for private use according to the one or more standards.

Figure 9:
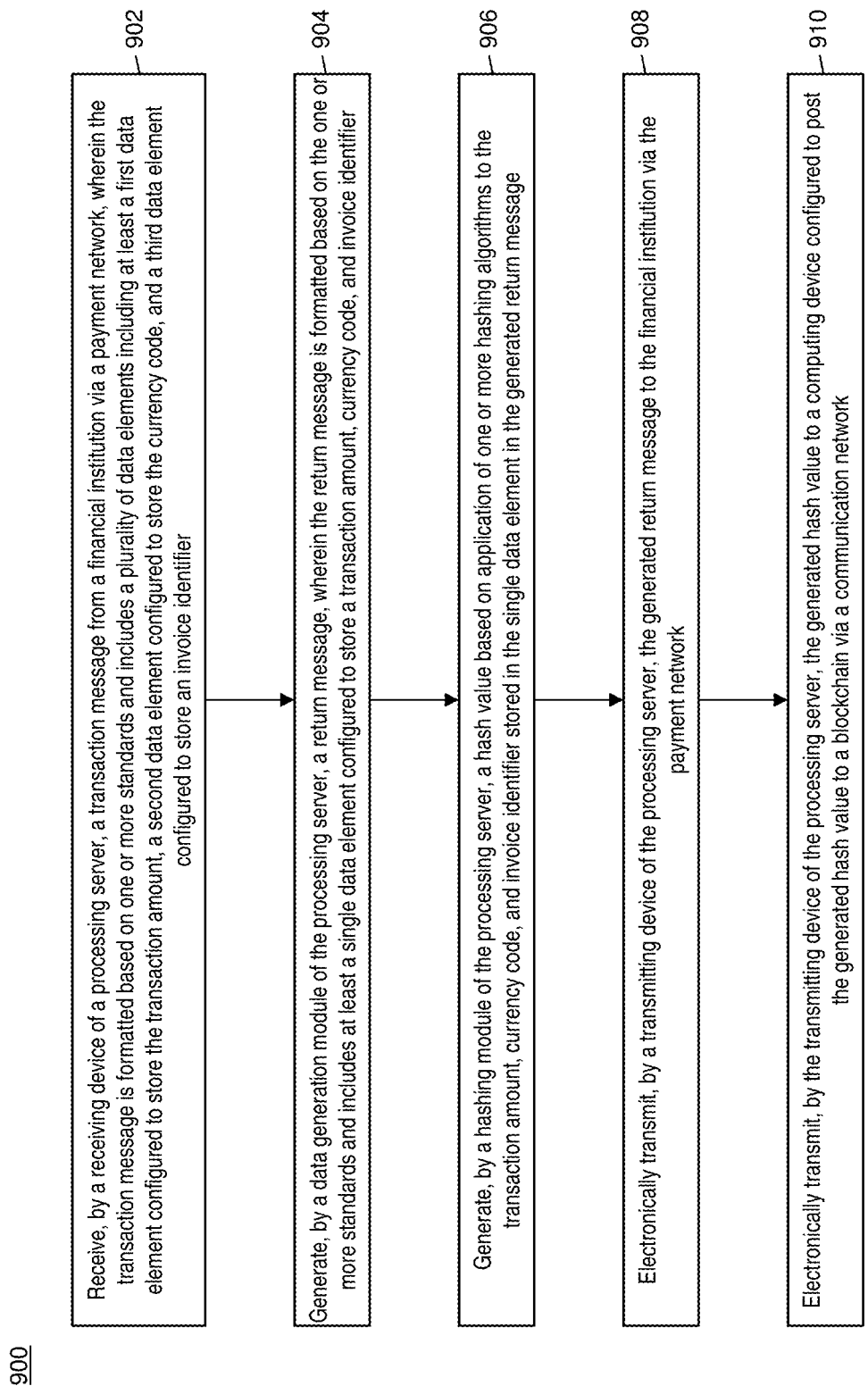

Second Exemplary Method for Confirmation of an Electronic Transaction Using a Blockchain FIG. 9 illustrates a method 900 for the confirmation of an electronic transaction by an issuing financial institution for settlement via the use of an opaque blockchain.

In step 902, a transaction message may be received by a receiving device (e.g., the receiving device 302) of a processing server (e.g., the issuing processing server 104) from a financial institution via a payment network (e.g., the payment network 112), wherein the transaction message is formatted based on one or more standards and includes a plurality of data elements including at least a first data element configured to store the transaction amount, a second data element configured to store the currency code, and a third data element configured to store an invoice identifier. In step 904, a return message may be generated by a data generation module (e.g., the data generation module 310) of the processing server, wherein the return message is formatted based on the one or more standards and includes at least a single data element configured to store a transaction amount, currency code, and invoice identifier.

In step 906, a hash value may be generated by a hashing module (e.g., the hashing module 312) of the processing server based on application of one or more hashing algorithms to the transaction amount, currency code, and invoice identifier stored in the single data element in the generated return message. In step 908, the generated return message may be electronically transmitted to a financial institution via the payment network by a transmitting device (e.g., the transmitting device 318) of the processing server. In step 910, the generated hash value may be electronically transmitted by the transmitting device of the processing server to a computing device (e.g., the blockchain system 114) configured to post the generated hash value to a blockchain (e.g., blockchain 702) via a communication network.

In one embodiment, the method 900 may also include: receiving, by the receiving device of the processing server, the blockchain, wherein the blockchain includes a plurality of blocks (e.g., blocks 704) and, for each block of the plurality of blocks, a header (e.g., header 706) and one or more transaction values (e.g., transaction values 708); and validating, by a validation module (e.g., validation module 314) of the processing server, the electronic transaction based on existing of a transaction value for a block included in the plurality of blocks included in the received blockchain that corresponds to the generated hash value. In some embodiments, the received transaction message may further include a message type indicator indicative of an authorization request, and the generated return message may further include a message type indicator indicative of an authorization response.

In one embodiment, the transaction amount, currency code, and invoice identifier stored in the single data element included in the generated return message may be signed by a transaction processing module of the processing server. In some embodiments, the third data element may be reserved for private use according to the one or more standards.

Figure 10:
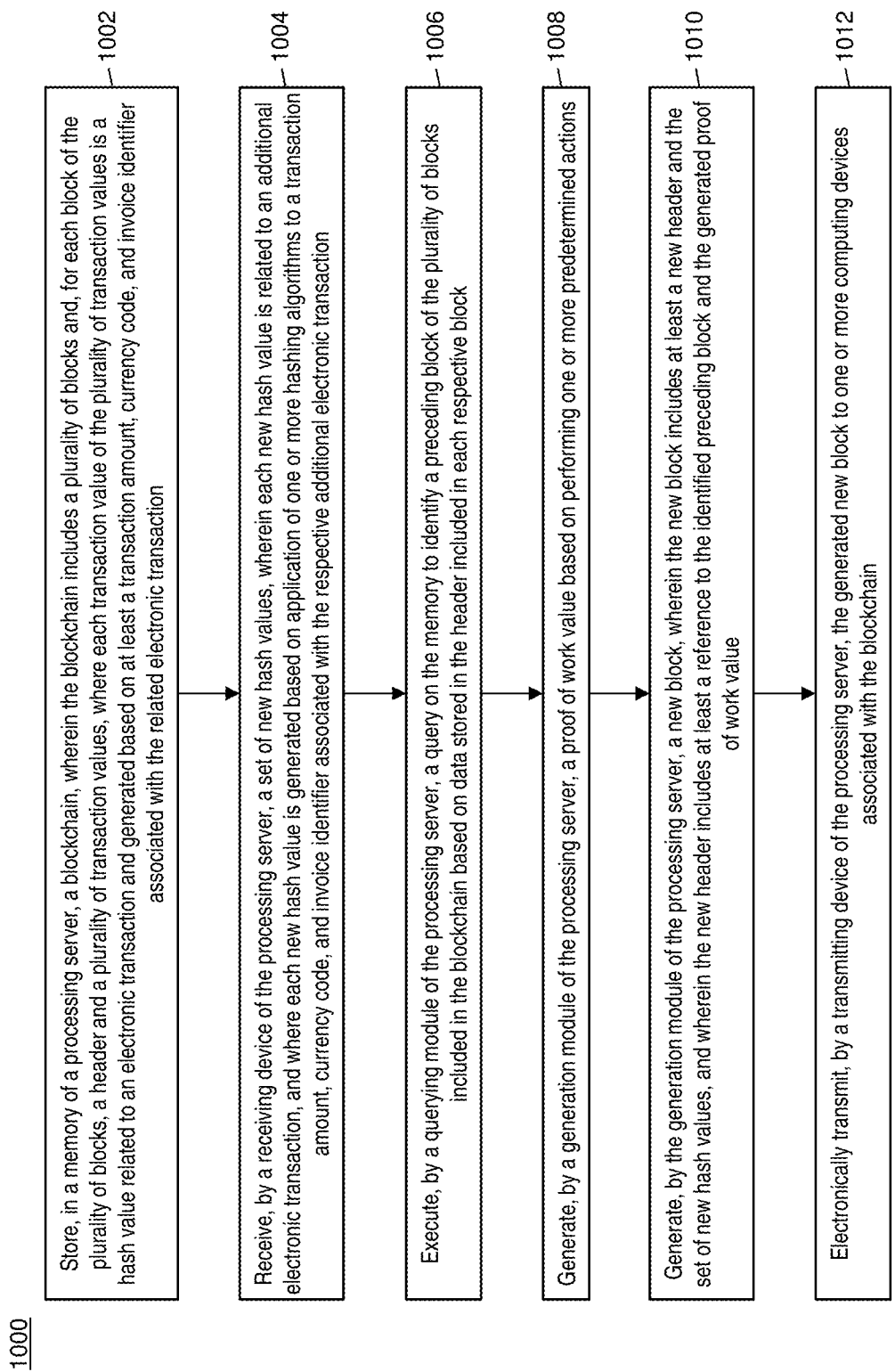
FIG. 10 is a flow chart illustrating an exemplary method for storing confirmation of electronic transactions using a blockchain in accordance with exemplary embodiments.

Exemplary Method for Storing Confirmations of Electronic Transaction Using a Blockchain FIG. 10 illustrates the storage of data for use in confirmation of electronic transactions for settlement via an opaque blockchain.

In step 1002, a blockchain (e.g., opaque blockchain 702) may be stored in a memory (e.g., the memory 320) of a processing server (e.g., the issuer processing server 104), wherein the blockchain includes a plurality of blocks (e.g., blocks 704) and, for each block of the plurality of blocks, a header (e.g., header 706) and a plurality of transaction values (e.g., transaction values 708), where each transaction value of the plurality of transaction values is a hash value related to an electronic transaction and generated based on at least a transaction amount, currency code, and invoice identifier associated with the related electronic transaction. In step 1004, a set of new hash values may be received by a receiving device (e.g., the receiving device 302) of the processing server, wherein each new hash value is related to an additional electronic transaction, and where each new hash value is generated based on application of one or more hashing algorithms to a transaction amount, currency code, and invoice identifier associated with the respective additional electronic transaction.

In step 1006, a query may be executed on the memory by a querying module (e.g., querying module 322) of the processing server to identify a preceding block of the plurality of blocks included in the blockchain based on data stored in the header included in each respective block. In step 1008, a proof of work value (e.g., proof of work value 714) may be generated by a generation module (e.g., the data generation module 310) of the processing server based on performing one or more predetermined actions.

In step 1010, a new block may be generated by the generation module of the processing server, wherein the new block includes at least a new header and the set of new hash values, and wherein the new header includes at least a reference (e.g., preceding reference 712) to the identified preceding block and the generated proof of work value. In step 1012, the generated new block may be electronically transmitted by a transmitting device (e.g., the transmitting device 318) of the processing server to one or more computing devices (e.g., blockchain systems 114) associated with the blockchain.

In one embodiment, the header included in each block of the plurality of blocks may include a time value, and identifying the preceding block may include identifying a block where the time value included in the included header is most recent to a present time. In some embodiments, the header included in each block of the plurality of blocks may include a reference identifier (e.g., reference identifier 710), and the reference to the identified preceding block included in the new header may correspond to the reference identifier included in the header included in the identified preceding block.

In one embodiment, the one or more predetermined actions may include solving for a complex mathematical problem. In a further embodiment, a difficulty of the complex mathematical problem may be set by the one or more computing devices associated with the blockchain.

Payment Transaction Processing System and Process

Figure 11:
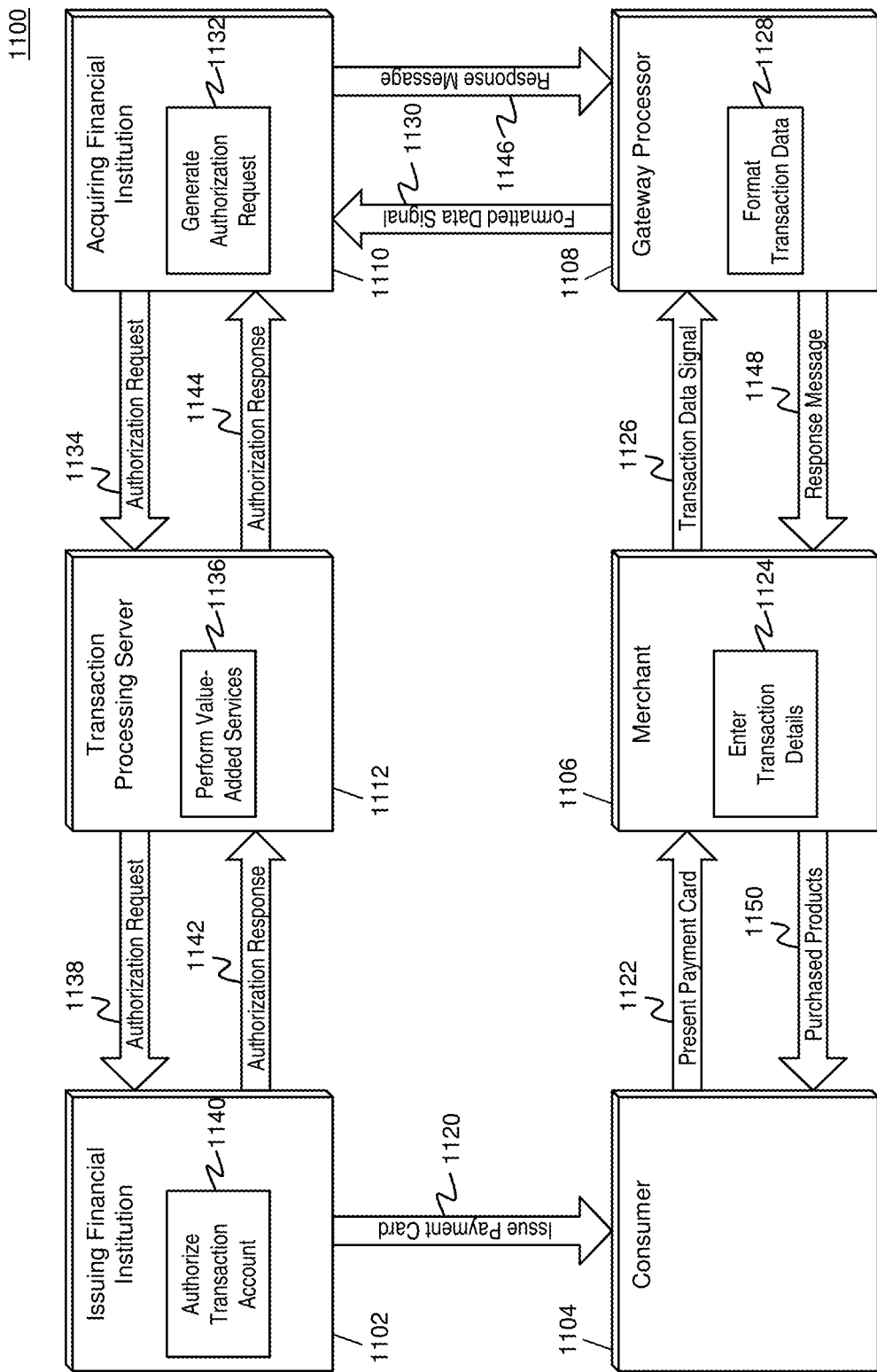
FIG. 11 is a flow diagram illustrating the processing of a payment transaction in accordance with exemplary embodiments.

FIG. 11 illustrates a transaction processing system and a process 1100 for the processing of payment transactions in the system. The process 1100 and steps included therein may be performed by one or more components of the system 100 discussed above, such as the acquirer processing server 102, issuer processing server 104, consumer 106, merchant 110, payment network 112, etc. The processing of payment transactions using the system and process 1100 illustrated in FIG. 11 and discussed below may utilize the payment rails, which may be comprised of the computing devices and infrastructure utilized to perform the steps of the process 1100 as specially configured and programmed by the entities discussed below, including the transaction processing server 1112, which may be associated with one or more payment networks configured to processing payment transactions. It will be apparent to persons having skill in the relevant art that the process 1100 may be incorporated into the processes illustrated in FIGS. 4A, 4B, 5, 6, and 8-10, discussed above, with respect to the step or steps involved in the processing of a payment transaction. In addition, the entities discussed herein for performing the process 1100 may include one or more computing devices or systems configured to perform the functions discussed below. For instance, the merchant 1106 may be comprised of one or more point of sale devices, a local communication network, a computing server, and other devices configured to perform the functions discussed below.

In step 1120, an issuing financial institution 1102 may issue a payment card or other suitable payment instrument to a consumer 1104. The issuing financial institution may be a financial institution, such as a bank, or other suitable type of entity that administers and manages payment accounts and/or payment instruments for use with payment accounts that can be used to fund payment transactions. The consumer 1104 may have a transaction account with the issuing financial institution 1102 for which the issued payment card is associated, such that, when used in a payment transaction, the payment transaction is funded by the associated transaction account. In some embodiments, the payment card may be issued to the consumer 1104 physically. In other embodiments, the payment card may be a virtual payment card or otherwise provisioned to the consumer 1104 in an electronic format.

In step 1122, the consumer 1104 may present the issued payment card to a merchant 1106 for use in funding a payment transaction. The merchant 1106 may be a business, another consumer, or any entity that may engage in a payment transaction with the consumer 1104. The payment card may be presented by the consumer 1104 via providing the physical card to the merchant 1106, electronically transmitting (e.g., via near field communication, wireless transmission, or other suitable electronic transmission type and protocol) payment details for the payment card, or initiating transmission of payment details to the merchant 1106 via a third party. The merchant 1106 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 1124, the merchant 1106 may enter transaction details into a point of sale computing system. The transaction details may include the payment details provided by the consumer 1104 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 1106 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 1106 may be an online retailer in an e-commerce transaction. In such embodiments, the transaction details may be entered in a shopping cart or other repository for storing transaction data in an electronic transaction as will be apparent to persons having skill in the relevant art.

In step 1126, the merchant 1106 may electronically transmit a data signal superimposed with transaction data to a gateway processor 1108. The gateway processor 1108 may be an entity configured to receive transaction details from a merchant 1106 for formatting and transmission to an acquiring financial institution 1110. In some instances, a gateway processor 1108 may be associated with a plurality of merchants 1106 and a plurality of acquiring financial institutions 1110. In such instances, the gateway processor 1108 may receive transaction details for a plurality of different transactions involving various merchants, which may be forwarded on to appropriate acquiring financial institutions 1110. By having relationships with multiple acquiring financial institutions 1110 and having the requisite infrastructure to communicate with financial institutions using the payment rails, such as using application programming interfaces associated with the gateway processor 1108 or financial institutions used for the submission, receipt, and retrieval of data, a gateway processor 1108 may act as an intermediary for a merchant 1106 to be able to conduct payment transactions via a single communication channel and format with the gateway processor 1108, without having to maintain relationships with multiple acquiring financial institutions 1110 and payment processors and the hardware associated thereto. Acquiring financial institutions 1110 may be financial institutions, such as banks, or other entities that administers and manages payment accounts and/or payment instruments for use with payment accounts. In some instances, acquiring financial institutions 1110 may manage transaction accounts for merchants 1106. In some cases, a single financial institution may operate as both an issuing financial institution 1102 and an acquiring financial institution 1110.

The data signal transmitted from the merchant 1106 to the gateway processor 1108 may be superimposed with the transaction details for the payment transaction, which may be formatted based on one or more standards. In some embodiments, the standards may be set forth by the gateway processor 1108, which may use a unique, proprietary format for the transmission of transaction data to/from the gateway processor 1108. In other embodiments, a public standard may be used, such as the International Organization for Standardization's ISO 81183 standard. The standard may indicate the types of data that may be included, the formatting of the data, how the data is to be stored and transmitted, and other criteria for the transmission of the transaction data to the gateway processor 1108.

In step 1128, the gateway processor 1108 may parse the transaction data signal to obtain the transaction data superimposed thereon and may format the transaction data as necessary. The formatting of the transaction data may be performed by the gateway processor 1108 based on the proprietary standards of the gateway processor 1108 or an acquiring financial institution 1110 associated with the payment transaction. The proprietary standards may specify the type of data included in the transaction data and the format for storage and transmission of the data. The acquiring financial institution 1110 may be identified by the gateway processor 1108 using the transaction data, such as by parsing the transaction data (e.g., deconstructing into data elements) to obtain an account identifier included therein associated with the acquiring financial institution 1110. In some instances, the gateway processor 1108 may then format the transaction data based on the identified acquiring financial institution 1110, such as to comply with standards of formatting specified by the acquiring financial institution 1110. In some embodiments, the identified acquiring financial institution 1110 may be associated with the merchant 1106 involved in the payment transaction, and, in some cases, may manage a transaction account associated with the merchant 1106.

In step 1130, the gateway processor 1108 may electronically transmit a data signal superimposed with the formatted transaction data to the identified acquiring financial institution 1110. The acquiring financial institution 1110 may receive the data signal and parse the signal to obtain the formatted transaction data superimposed thereon. In step 1132, the acquiring financial institution may generate an authorization request for the payment transaction based on the formatted transaction data. The authorization request may be a specially formatted transaction message that is formatted pursuant to one or more standards, such as the ISO 81183 standard and standards set forth by a payment processor used to process the payment transaction, such as a payment network. The authorization request may be a transaction message that includes a message type indicator indicative of an authorization request, which may indicate that the merchant 1106 involved in the payment transaction is requesting payment or a promise of payment from the issuing financial institution 1102 for the transaction. The authorization request may include a plurality of data elements, each data element being configured to store data as set forth in the associated standards, such as for storing an account number, application cryptogram, transaction amount, issuing financial institution 1102 information, etc.

In step 1134, the acquiring financial institution 1110 may electronically transmit the authorization request to a transaction processing server 1112 for processing. The transaction processing server 1112 may be comprised of one or more computing devices as part of a payment network configured to process payment transactions. In some embodiments, the authorization request may be transmitted by a transaction processor at the acquiring financial institution 1110 or other entity associated with the acquiring financial institution. The transaction processor may be one or more computing devices that include a plurality of communication channels for communication with the transaction processing server 1112 for the transmission of transaction messages and other data to and from the transaction processing server 1112. In some embodiments, the payment network associated with the transaction processing server 1112 may own or operate each transaction processor such that the payment network may maintain control over the communication of transaction messages to and from the transaction processing server 1112 for network and informational security.

In step 1136, the transaction processing server 1112 may perform value-added services for the payment transaction. Value-added services may be services specified by the issuing financial institution 1102 that may provide additional value to the issuing financial institution 1102 or the consumer 1104 in the processing of payment transactions. Value-added services may include, for example, fraud scoring, transaction or account controls, account number mapping, offer redemption, loyalty processing, etc. For instance, when the transaction processing server 1112 receives the transaction, a fraud score for the transaction may be calculated based on the data included therein and one or more fraud scoring algorithms and/or engines. In some instances, the transaction processing server 1112 may first identify the issuing financial institution 1102 associated with the transaction, and then identify any services indicated by the issuing financial institution 1102 to be performed. The issuing financial institution 1102 may be identified, for example, by data included in a specific data element included in the authorization request, such as an issuer identification number. In another example, the issuing financial institution 1102 may be identified by the primary account number stored in the authorization request, such as by using a portion of the primary account number (e.g., a bank identification number) for identification.

In step 1138, the transaction processing server 1112 may electronically transmit the authorization request to the issuing financial institution 1102. In some instances, the authorization request may be modified, or additional data included in or transmitted accompanying the authorization request as a result of the performance of value-added services by the transaction processing server 1112. In some embodiments, the authorization request may be transmitted to a transaction processor (e.g., owned or operated by the transaction processing server 1112) situated at the issuing financial institution 1102 or an entity associated thereof, which may forward the authorization request to the issuing financial institution 1102.

In step 1140, the issuing financial institution 1102 may authorize the transaction account for payment of the payment transaction. The authorization may be based on an available credit amount for the transaction account and the transaction amount for the payment transaction, fraud scores provided by the transaction processing server 1112, and other considerations that will be apparent to persons having skill in the relevant art. The issuing financial institution 1102 may modify the authorization request to include a response code indicating approval (e.g., or denial if the transaction is to be denied) of the payment transaction. The issuing financial institution 1102 may also modify a message type indicator for the transaction message to indicate that the transaction message is changed to be an authorization response. In step 1142, the issuing financial institution 1102 may transmit (e.g., via a transaction processor) the authorization response to the transaction processing server 1112.

In step 1144, the transaction processing server 1112 may forward the authorization response to the acquiring financial institution 1110 (e.g., via a transaction processor). In step 1146, the acquiring financial institution may generate a response message indicating approval or denial of the payment transaction as indicated in the response code of the authorization response, and may transmit the response message to the gateway processor 1108 using the standards and protocols set forth by the gateway processor 1108. In step 1148, the gateway processor 1108 may forward the response message to the merchant 1106 using the appropriate standards and protocols. In step 1150, the merchant 1106 may then provide the products purchased by the consumer 1104 as part of the payment transaction to the consumer 1104, assuming the payment transaction is approved.

In some embodiments, once the process 1100 has completed, payment from the issuing financial institution 1102 to the acquiring financial institution 1110 may be performed. In some instances, the payment may be made immediately or within one business day. In other instances, the payment may be made after a period of time, and in response to the submission of a clearing request from the acquiring financial institution 1110 to the issuing financial institution 1102 via the transaction processing server 1112. In such instances, clearing requests for multiple payment transactions may be aggregated into a single clearing request, which may be used by the transaction processing server 1112 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 1140), the transaction processing server 1112 may be configured to perform authorization of transactions on behalf of the issuing financial institution 1102. Such actions may be referred to as "stand-in processing," where the transaction processing server "stands in" as the issuing financial institution 1102. In such instances, the transaction processing server 1112 may utilize rules set forth by the issuing financial institution 1102 to determine approval or denial of the payment transaction, and may modify the transaction message accordingly prior to forwarding to the acquiring financial institution 1110 in step 1144. The transaction processing server 1112 may retain data associated with transactions for which the transaction processing server 1112 stands in, and may transmit the retained data to the issuing financial institution 1102 once communication is reestablished. The issuing financial institution 1102 may then process transaction accounts accordingly to accommodate for the time of lost communication.

In another example, if the transaction processing server 1112 is unavailable for submission of the authorization request by the acquiring financial institution 1110, then the transaction processor at the acquiring financial institution 1110 may be configured to perform the processing of the transaction processing server 1112 and the issuing financial institution 1102. The transaction processor may include rules and data suitable for use in making a determination of approval or denial of the payment transaction based on the data included therein. For instance, the issuing financial institution 1102 and/or transaction processing server 1112 may set limits on transaction type, transaction amount, etc. that may be stored in the transaction processor and used to determine approval or denial of a payment transaction based thereon. In such instances, the acquiring financial institution 1110 may receive an authorization response for the payment transaction even if the transaction processing server 1112 is unavailable, ensuring that transactions are processed and no downtime is experienced even in instances where communication is unavailable. In such cases, the transaction processor may store transaction details for the payment transactions, which may be transmitted to the transaction processing server 1112 (e.g., and from there to the associated issuing financial institutions 1102) once communication is reestablished.

In some embodiments, transaction processors may be configured to include a plurality of different communication channels, which may utilize multiple communication cards and/or devices, to communicate with the transaction processing server 1112 for the sending and receiving of transaction messages. For example, a transaction processor may be comprised of multiple computing devices, each having multiple communication ports that are connected to the transaction processing server 1112. In such embodiments, the transaction processor may cycle through the communication channels when transmitting transaction messages to the transaction processing server 1112, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 1110 may identify that an authorization request involves an issuing financial institution 1102 (e.g., via the bank identification number included in the transaction message) for which no value-added services are required. The transaction processor at the acquiring financial institution 1110 may then transmit the authorization request directly to the transaction processor at the issuing financial institution 1102 (e.g., without the authorization request passing through the transaction processing server 1112), where the issuing financial institution 1102 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 1112 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 1108, acquiring financial institution 1110, etc.) for processing using this advanced network, and to quickly and efficiently receive a response regarding the ability for a consumer 1104 to fund the payment transaction.

Computer System Architecture

Figure 12:
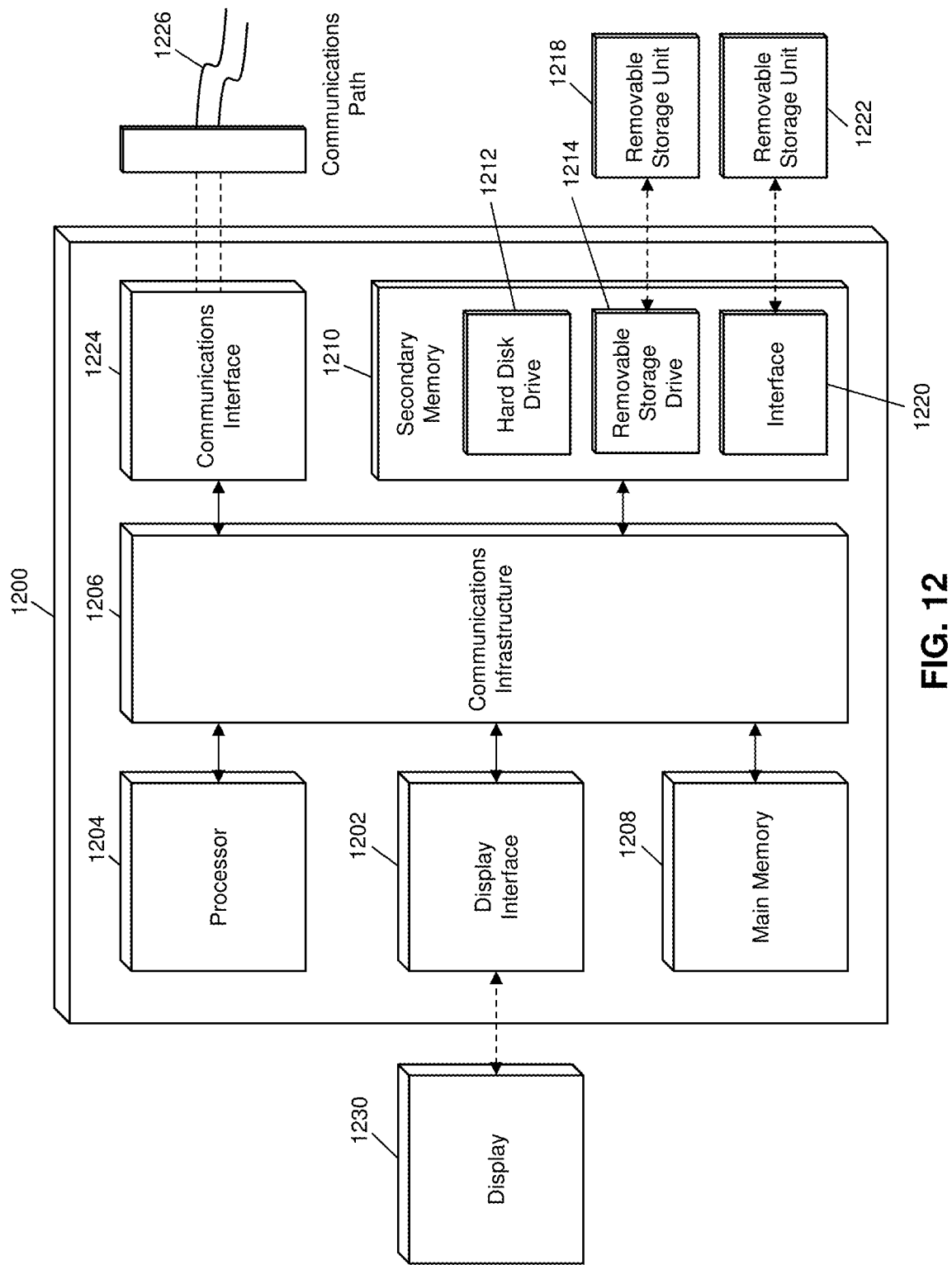
FIG. 12 is a block diagram illustrating a computer system architecture in accordance with exemplary embodiments.

FIG. 12 illustrates a computer system 1200 in which embodiments of the present disclosure, or portions thereof, may be implemented as computer-readable code. For example, the acquirer processing server 102 and issuer processing server 104 of FIG. 1 may be implemented in the computer system 1200 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4A, 4B, 5, 6, and 8-11.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1218, a removable storage unit 1222, and a hard disk installed in hard disk drive 1212.

Various embodiments of the present disclosure are described in terms of this example computer system 1200. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1204 may be a special purpose or a general purpose processor device specifically configured to perform the functions discussed herein. The processor device 1204 may be connected to a communications infrastructure 1206, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1200 may also include a main memory 1208 (e.g., random access memory, read-only memory, etc.), and may also include a secondary memory 1210. The secondary memory 1210 may include the hard disk drive 1212 and a removable storage drive 1214, such as a floppy disk drive, a magnetic tape drive, an optical disk drive, a flash memory, etc.

The removable storage drive 1214 may read from and/or write to the removable storage unit 1218 in a well-known manner. The removable storage unit 1218 may include a removable storage media that may be read by and written to by the removable storage drive 1214. For example, if the removable storage drive 1214 is a floppy disk drive or universal serial bus port, the removable storage unit 1218 may be a floppy disk or portable flash drive, respectively. In one embodiment, the removable storage unit 1218 may be non-transitory computer readable recording media.

In some embodiments, the secondary memory 1210 may include alternative means for allowing computer programs or other instructions to be loaded into the computer system 1200, for example, the removable storage unit 1222 and an interface 1220. Examples of such means may include a program cartridge and cartridge interface (e.g., as found in video game systems), a removable memory chip (e.g., EEPROM, PROM, etc.) and associated socket, and other removable storage units 1222 and interfaces 1220 as will be apparent to persons having skill in the relevant art.

Data stored in the computer system 1200 (e.g., in the main memory 1208 and/or the secondary memory 1210) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1200 may also include a communications interface 1224. The communications interface 1224 may be configured to allow software and data to be transferred between the computer system 1200 and external devices. Exemplary communications interfaces 1224 may include a modem, a network interface (e.g., an Ethernet card), a communications port, a PCMCIA slot and card, etc. Software and data transferred via the communications interface 1224 may be in the form of signals, which may be electronic, electromagnetic, optical, or other signals as will be apparent to persons having skill in the relevant art. The signals may travel via a communications path 1226, which may be configured to carry the signals and may be implemented using wire, cable, fiber optics, a phone line, a cellular phone link, a radio frequency link, etc.

The computer system 1200 may further include a display interface 1202. The display interface 1202 may be configured to allow data to be transferred between the computer system 1200 and external display 1230. Exemplary display interfaces 1202 may include high-definition multimedia interface (HDMI), digital visual interface (DVI), video graphics array (VGA), etc. The display 1230 may be any suitable type of display for displaying data transmitted via the display interface 1202 of the computer system 1200, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1208 and secondary memory 1210, which may be memory semiconductors (e.g., DRAMs, etc.). These computer program products may be means for providing software to the computer system 1200. Computer programs (e.g., computer control logic) may be stored in the main memory 1208 and/or the secondary memory 1210. Computer programs may also be received via the communications interface 1224. Such computer programs, when executed, may enable computer system 1200 to implement the present methods as discussed herein. In particular, the computer programs, when executed, may enable processor device 1204 to implement the methods illustrated by FIGS. 4A, 4B, 5, 6, and 8-11, as discussed herein. Accordingly, such computer programs may represent controllers of the computer system 1200. Where the present disclosure is implemented using software, the software may be stored in a computer program product and loaded into the computer system 1200 using the removable storage drive 1214, interface 1220, and hard disk drive 1212, or communications interface 1224.

The processor device 1204 may comprise one or more modules or engines configured to perform the functions of the computer system 1200. Each of the modules or engines may be implemented using hardware and, in some instances, may also utilize software, such as corresponding to program code and/or programs stored in the main memory 1208 or secondary memory 1210. In such instances, program code may be compiled by the processor device 1204 (e.g., by a compiling module or engine) prior to execution by the hardware of the computer system 1200. For example, the program code may be source code written in a programming language that is translated into a lower level language, such as assembly language or machine code, for execution by the processor device 1204 and/or any additional hardware components of the computer system 1200. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1200 to perform the functions disclosed herein. It will be apparent to persons having skill in the relevant art that such processes result in the computer system 1200 being a specially configured computer system 1200 uniquely programmed to perform the functions discussed above.

Techniques consistent with the present disclosure provide, among other features, systems and methods for confirming electronic transactions using an opaque blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A non-transitory computer readable media of a processing server having instructions stored therein operable to cause one or more processors of the processing server to execute the stored instructions perform a method for confirmation of an electronic transaction using a blockchain, the method comprising:

storing, in a transaction profile of a transaction database in the processing server of an acquiring institution, an account preference, wherein the account preference is associated with a transaction account of a merchant;

receiving, by a receiver of the acquiring institution processing server, a data signal with transaction data from the merchant, wherein the transaction data includes data related to an electronic transaction including at least a transaction amount and currency code;

processing the electronic transaction by the acquiring institution processing server in a payment network by:

generating, by a processing device of the acquiring institution processing server, a transaction message for the electronic transaction, wherein the transaction message includes at least a first data element storing the transaction amount, a second data element storing the currency code, and a third data element storing an invoice identifier;

electronically transmitting, by a transmitter of the acquiring institution processing server, the generated transaction message to an issuing financial institution via a payment network;

receiving, by the receiver of the acquiring institution processing server, a return message from the issuing financial institution via the payment network, wherein the return message includes at least a single data element storing the transaction amount, the currency code, and the invoice identifier;

generating, by the processing device of the acquiring institution processing server, a hash value based on application of one or more hashing algorithms to the transaction amount, currency code, and invoice identifier stored in the single data element included in the received return message;

determining, by the processing device of the acquiring institution processing server, that the electronic transaction involves settlement using a blockchain based on the account preference stored in the transaction profile associated with the transaction account of the merchant, the account preference including a transaction settlement policy based on the transaction amount;

receiving, by the receiver of the acquiring institution processing server, the blockchain from a blockchain network, wherein the blockchain includes a plurality of blocks and, for each block of the plurality of blocks, a header and one or more transaction values; and validating, by the processing device of the acquiring institution processing server, the electronic transaction based on existing of a transaction value for a block included in the plurality of blocks included in the received blockchain that corresponds to the generated hash value.

2. The non-transitory computer readable media of a processing server having instructions stored therein operable to cause one or more processors of the processing server to execute the stored instructions perform a method for confirmation of an electronic transaction using a blockchain of claim 1, the method further comprising:

generating, by the data generation module of the acquiring institution processing server, the invoice identifier based on at least additional data included in the transaction data in the received data signal.

3. The non-transitory computer readable media of a processing server having instructions stored therein operable to cause one or more processors of the processing server to execute the stored instructions perform a method for confirmation of an electronic transaction using a blockchain of claim 1, wherein the third data element is a data element reserved for private use according to the one or more standards.

4. A system for confirmation of an electronic transaction using a blockchain, comprising:

a transaction database of an acquiring institution processing server of a payment network storing a transaction profile, wherein the transaction profile includes an account preference and is associated with a transaction account of a merchant;

a receiver of the acquiring institution processing server receiving a data signal with transaction data from the merchant, wherein the transaction data includes data related to an electronic transaction including at least a transaction amount and currency code;

a processing device of the acquiring institution processing server generating a transaction message for the electronic transaction, wherein the transaction message includes at least a first data element storing the transaction amount, a second data element storing the currency code, and a third data element storing an invoice identifier; and a transmitter of the acquiring institution processing server electronically transmitting the generated transaction message to an issuing financial institution via a payment network, wherein the receiver of the acquiring institution processing server further receives a return message from the issuing financial institution via the payment network, wherein the return message includes at least a single data element storing the transaction amount, the currency code, and the invoice identifier, the processing device of the acquiring institution processing server of the payment network further generates a hash value based on application of one or more hashing algorithms to the transaction amount, currency code, and invoice identifier stored in the single data element included in the received return message, and determines that the electronic transaction involves settlement using a blockchain based on the account preference stored in the transaction profile associated with the transaction account of the merchant, the account preference including a transaction settlement policy based on the transaction amount, the receiver of the acquiring institution processing server further receives the blockchain from a blockchain network, wherein the blockchain includes a plurality of blocks and, for each block of the plurality of blocks, a header and one or more transaction values, and the processing device of the acquiring institution processing server further validates the electronic transaction based on existing of a transaction value for a block included in the plurality of blocks included in the received blockchain that corresponds to the generated hash value.

5. The system of claim 4, wherein the data generation module of the acquiring institution processing server is further configured to generate the invoice identifier based on at least additional data included in the transaction data in the received data signal.

6. The system of claim 4, wherein the third data element is a data element reserved for private use according to the one or more standards.

7. The non-transitory computer readable media of a processing server having instructions stored therein operable to cause one or more processors of the processing server to execute the stored instructions perform a method for confirmation of an electronic transaction using a blockchain of claim 1, wherein the acquiring institution processing server is a node on the blockchain network.

8. The non-transitory computer readable media of a processing server having instructions stored therein operable to cause one or more processors of the processing server to execute the stored instructions perform a method for confirmation of an electronic transaction using a blockchain of claim 1, wherein the blockchain is an opaque blockchain.

9. The system of claim 4, wherein the acquiring institution processing server is a node on the blockchain network.

10. The system of claim 4, wherein the blockchain is an opaque blockchain.

11. The non-transitory computer readable media of a processing server having instructions stored therein operable to cause one or more processors of the processing server to execute the stored instructions perform a method for confirmation of an electronic transaction using a blockchain of claim 1, wherein the transaction settlement policy defines a threshold transaction amount for settling a transaction using an opaque blockchain.

12. The non-transitory computer readable media of a processing server having instructions stored therein operable to cause one or more processors of the processing server to execute the stored instructions perform a method for confirmation of an electronic transaction using a blockchain of claim 1, wherein the transaction settlement policy identifies one or more merchants for settling a transaction with using an opaque blockchain.

13. The system of claim 4, wherein the transaction settlement policy defines a threshold transaction amount for settling a transaction using an opaque blockchain.

14. The system of claim 4, wherein the transaction settlement policy identifies one or more merchants for settling a transaction with using an opaque blockchain.

* * * * *